(12) United States Patent
McDonnell

(10) Patent No.: US 10,167,922 B2
(45) Date of Patent: Jan. 1, 2019

(54) MULTISTRUCTURAL SHOCK ABSORBING SYSTEM FOR ANATOMICAL CUSHIONING

(71) Applicant: Kevin McDonnell, Miami, FL (US)

(72) Inventor: Kevin McDonnell, Miami, FL (US)

(73) Assignee: Kevin McDonnell, Miami, FL (US)

( * ) Notice: Subject to any disclaimer, the term of this patent is extended or adjusted under 35 U.S.C. 154(b) by 351 days.

(21) Appl. No.: 14/832,636

(22) Filed: Aug. 21, 2015

(65) Prior Publication Data

US 2015/0354662 A1    Dec. 10, 2015

Related U.S. Application Data

(63) Continuation-in-part of application No. 13/283,919, filed on Oct. 28, 2011, now abandoned.

(51) Int. Cl.

| | |
|---|---|
| A43B 13/18 | (2006.01) |
| A43B 21/32 | (2006.01) |
| A43B 13/20 | (2006.01) |
| F16D 57/00 | (2006.01) |
| F16F 5/00 | (2006.01) |
| B32B 1/00 | (2006.01) |
| A42B 3/00 | (2006.01) |
| F16F 13/06 | (2006.01) |
| A42B 3/12 | (2006.01) |
| A43B 17/03 | (2006.01) |
| F16F 9/10 | (2006.01) |
| A43B 1/00 | (2006.01) |
| A43B 13/12 | (2006.01) |
| A63B 71/08 | (2006.01) |
| A63B 71/12 | (2006.01) |

(52) U.S. Cl.
CPC ............. *F16F 13/06* (2013.01); *A42B 3/121* (2013.01); *A43B 1/0054* (2013.01); *A43B 13/12* (2013.01); *A43B 13/181* (2013.01); *A43B 13/189* (2013.01); *A43B 13/206* (2013.01); *A43B 17/03* (2013.01); *A63B 71/081* (2013.01); *A63B 71/1225* (2013.01); *F16F 9/106* (2013.01); *A63B 2071/1258* (2013.01); *A63B 2209/10* (2013.01)

(58) Field of Classification Search
CPC ..... A43B 13/20; A43B 13/203; A43B 13/206; A43B 13/181; A43B 13/18; A42B 3/122; B60G 2202/154
USPC ............. 36/28, 37, 44, 69, 71, 76, 59 C, 29; 188/266; 267/140.11; 428/176; 2/413
See application file for complete search history.

(56) References Cited

U.S. PATENT DOCUMENTS

| | | | | |
|---|---|---|---|---|
| 5,060,328 A | * | 10/1991 | Larson ................. | A47C 27/085 297/DIG. 8 |
| 5,131,174 A | * | 7/1992 | Drew .................... | A43B 21/28 36/29 |
| 5,155,927 A | | 10/1992 | Bates et al. | |
| 5,915,819 A | * | 6/1999 | Gooding ............... | A42B 3/121 36/10 |

(Continued)

*Primary Examiner* — Timothy K Trieu
(74) *Attorney, Agent, or Firm* — Felix L. Fischer

(57) ABSTRACT

A shock absorbing system for impact energy dissipation employs removable unitary cells of compressible members in communication with a reservoir and containing a first working fluid. Resilient structural members may be placed intermediate the compressible members to deform responsive to compression to provide both energy dissipation and resilient recovery of the compression cylinders to their uncompressed state.

11 Claims, 31 Drawing Sheets

(56) References Cited

U.S. PATENT DOCUMENTS

| | | | | |
|---|---|---|---|---|
| 6,000,147 A | * | 12/1999 | Kellerman | A43B 7/142 |
| | | | | 36/160 |
| 7,383,648 B1 | * | 6/2008 | Litchfield | A43B 13/203 |
| | | | | 36/29 |
| 2004/0244223 A1 | * | 12/2004 | Watkins | A43B 13/189 |
| | | | | 36/29 |
| 2006/0229174 A1 | * | 10/2006 | Bonutti | A63B 21/0004 |
| | | | | 482/111 |
| 2009/0013557 A1 | * | 1/2009 | Rudy | A43B 13/206 |
| | | | | 36/29 |
| 2010/0229427 A1 | | 9/2010 | Campbell | |
| 2014/0310989 A1 | | 10/2014 | Lapp | |

* cited by examiner

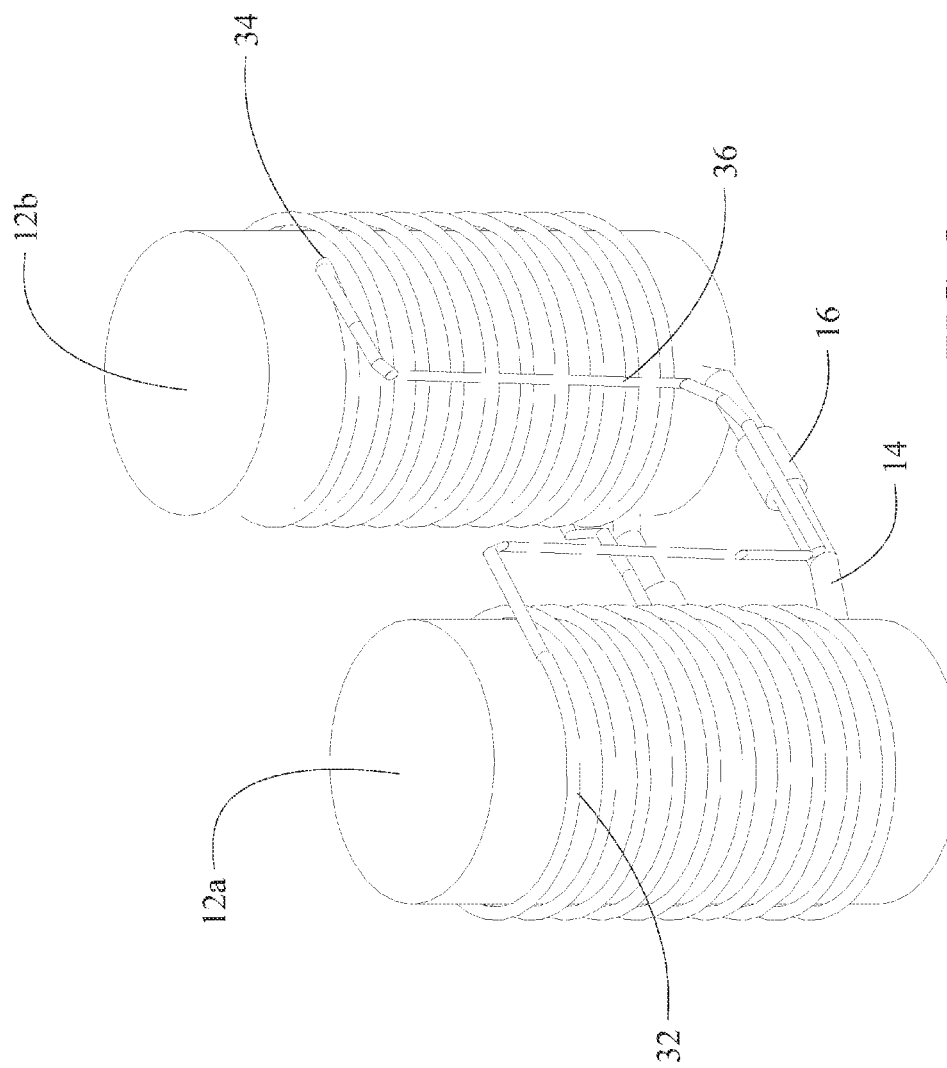

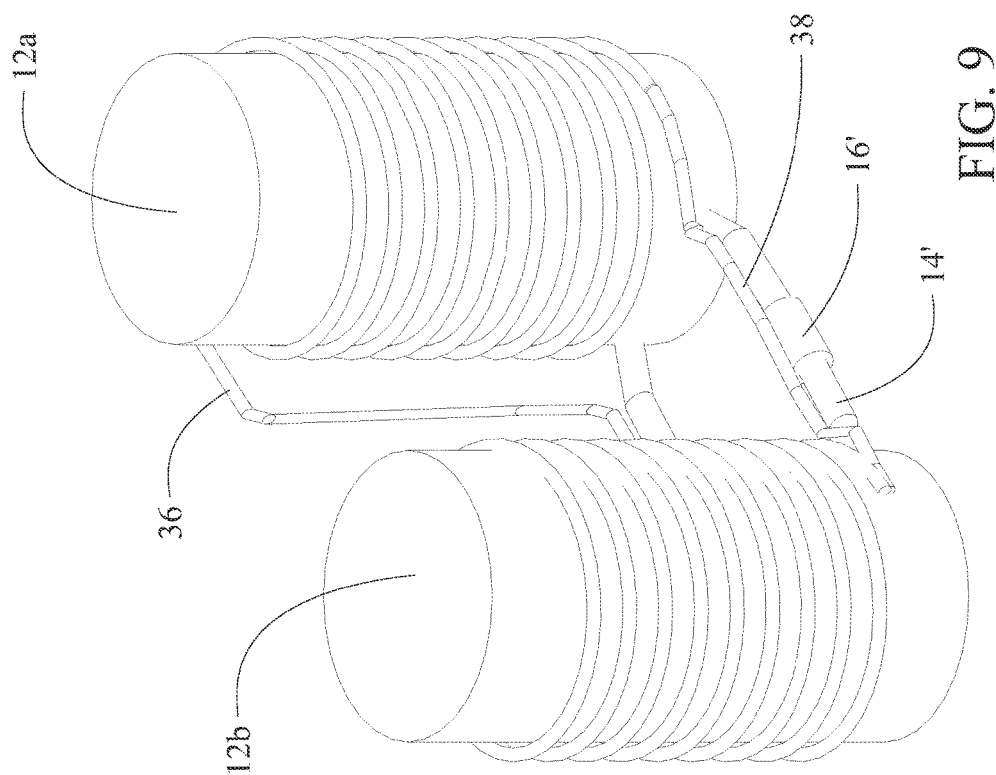

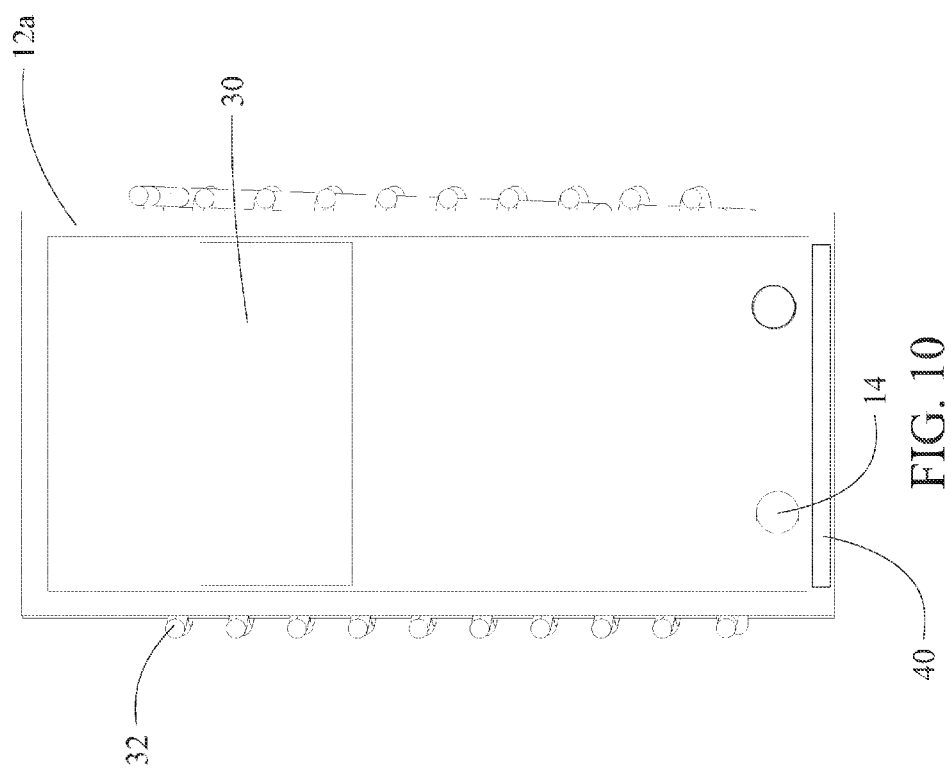

MULTISTRUCTURAL SHOCK ABSORBING SYSTEM FOR ANATOMICAL CUSHIONING

REFERENCES TO RELATED APPLICATIONS

This application is a continuation in part (CIP) of application Ser. No. 13/283,919 filed on Oct. 28, 2011 entitled MULTISTRUCTURAL SHOCK ABSORBING SYSTEM FOR ANATOMICAL CUSHIONING the disclosure of which is incorporated herein by reference.

BACKGROUND OF THE INVENTION

Field of the Invention

This invention relates generally to the field of shock absorbing devices for reducing anatomical shock including hiking, walking, athletic or running shoes, padding systems such as shin guards or shoulder pads and helmets, or flooring and, more particularly, to a structural support system having multiple compressible cylinders interconnected with a fluid accumulator or reservoir and resilient structural elements to provide impulse attenuation from impacts including possible unitary cells for easy replacement if ruptured.

Description of the Related Art

Athletes engaging in sports of various types continue to expand the limits of their performance. Impact from running or other rapid movement trauma, body or ball contact such as in football or soccer associated sports is increasingly creating various stress or impact related injuries including concussions. Many activities are pursued by individuals in which heel strike or other foot impact including walking, hiking, running or other sports activities may contribute to repetitive stress injury or other long term complications. In sports such as football, blows to the body and head, while padded to some extent, are becoming more forceful and the potential for injury is increasing. Other sports such as soccer or lacrosse or hockey require shin guards or other padding to ameliorate strikes on the body from balls, competitor's kicks or playing implements such as lacrosse sticks or hockey sticks. In addition, potential for significant injury in activities such as motorcycling, bicycling, skiing, and other sports, requires that helmets be used for force and impulse reduction/redistribution. Resilient mechanical elements, pneumatic bladders and other elements have been employed. However, shock absorbing elements used in prior art systems may degrade or rupture reducing their effectiveness.

It is desirable to provide a structure which adequately absorbs and dissipates impact energy that can be tailored to the activity such as walking, running, hiking or other sports in which the individual or athlete is engaged and provide easy replacement if shock absorbing capability is degraded.

SUMMARY OF THE INVENTION

The embodiments of the present invention described herein provide a shock absorbing system for impulse attenuation, impulse modification or reduction, employing a first plurality of compressible cylinders each having an internal void containing a first working fluid. At least one accumulator is connected to the first plurality of compressible cylinders through a fluid conduit such that the first working fluid is transferred from the related compressible cylinder to the accumulator responsive to compression induced an applied force. A flow restriction element may be associated with each fluid conduit. A pad and a liner may intermediately constrain the first plurality of compressible cylinders for integration into a shoe, sports pad or helmet. Unitary cells incorporating the first plurality of compressible members and the accumulator may be encompassed by a membrane within which a secondary working fluid may be contained. The unitary cells may be individually replaceable for repair of ruptured or degraded compressible members, accumulator or membrane. Multiple unitary cells may be constrained between the pad and liner or the membrane on individual unitary cells may replace the function of the pad and liner.

In alternative embodiments, a plurality of resilient structural members are placed intermediate the compressible members. The resilient structural members deform responsive to compression of the foot bed induced by foot strike or other applied force, provide both impulse attenuation and resilient recovery of the compression cylinders to their uncompressed state. The resilient structural members may be arcuate filaments extending from the pad and the arcuate members may or may not orthogonally surround each compressible member singly or in combination with upstanding filaments extending intermediate the pad and liner to provide a skeletal structure supporting and resiliently separating the pad and liner.

BRIEF DESCRIPTION OF THE DRAWINGS

These and other features and advantages of the present invention will be better understood by reference to the following detailed description when considered in connection with the accompanying drawings wherein:

FIG. 8 is an isometric view of the details of an interrelated pair of compression cylinders with magnetic energy dissipation;

FIG. 9 is a reverse isometric view of the embodiment shown in FIG. 8;

FIG. 10 is a sectional end in view of the compression cylinder incorporating a buoyant magnet electromagnetic induction coil, impact prevention magnet, and fluid flow ports;

DETAILED DESCRIPTION OF THE INVENTION

Figure 1:
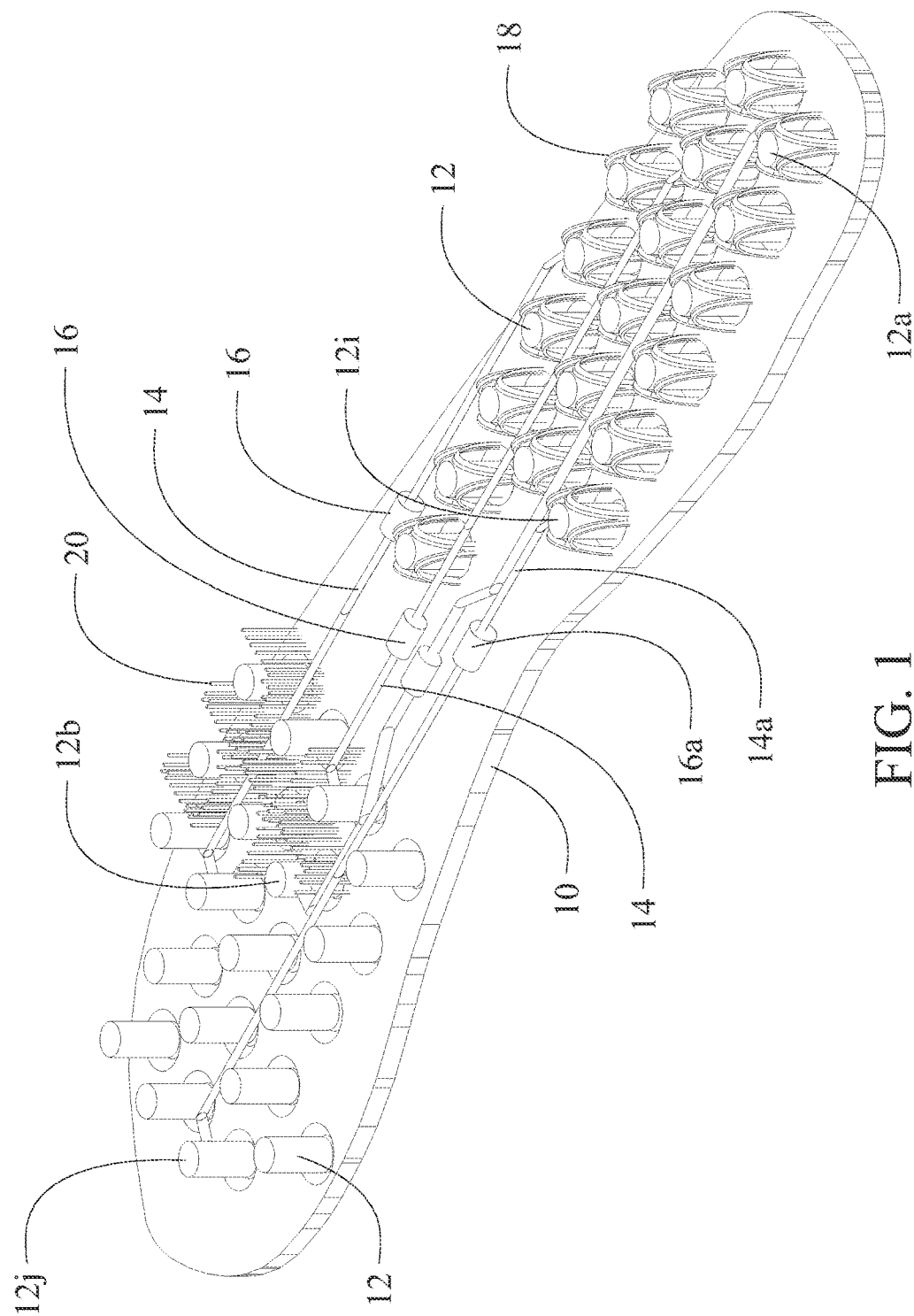
FIG. 1 is an isometric view partial section view showing the structural component's of a first embodiment of the invention as employed in a shoe.

Referring to the drawings for description of the invention as utilized in a shoe, FIG. 1 shows a sole pad 10 which in various embodiments is an insert received over the sole of an athletic shoe. In alternative embodiments the sole pad is integral with the sole and may incorporate various tread designs or other features on the bottom of the pad. Compression elements shown as compression cylinders 12 constructed from resilient material such as natural or synthetic rubber and having a central void, as will be described in greater detail subsequently, extend from the sole pad upward. While shown and referred to herein as cylindrical in shape, the compression elements may be of various geometrical shapes. In an exemplary embodiment as shown in the drawings, the void in each compression cylinder is partially filled with a first working fluid leaving a compressible gas pad. In alternative embodiments, no gas working space remains in the cylinder and the walls of each cylinder are substantially collapsible when not engorged with fluid. Initial embodiments employ viscous oil as the first working fluid however any appropriate fluid including air may be utilized.

Each compression cylinder, for example cylinder 12a, is matched with a second compression cylinder, for example cylinder 12b, and interconnected with a fluid conduit 14. The number and placement of the compression cylinders is determined based on the shoe shape and desired impact absorption. For the embodiment shown multiple cylinders are placed in the heel section with matched cylinders placed in the toe section. A foot bed 11 overlies the compression cylinders encasing the support structure in combination with the sole pad. As will be described subsequently with respect to FIG. 15, compression cylinders with a central reservoir may be solely contained within the hindfoot or forefoot.

Using cylinders 12a and 12b as examples, when the wearer takes a step creating an initial heel strike transmitted through the foot bed, cylinder 12a is compressed forcing the working fluid into conduit 14a. In certain embodiments, a flow restrictor 16a regulates flow of the fluid from the compressing cylinder 12a to cylinder 12b (or an accumulator as described subsequently) as the receiving cylinder. The gas pad in the receiving cylinder is compressed, or in alternative embodiments the collapsed cylinder walls expanded, and the combination of the compression of the resilient compression cylinder 12a, fluid transfer through the restriction, and gas pad compression or cylinder wall expansion in the receiving cylinder 12b provides multiple energy dissipation mechanisms to attenuate the heel strike thereby decreasing the energy transferred back to the foot from the ground attenuating the impulse. As the wearer's foot rolls forward the process is reversed resulting in compression of cylinder 12b with resulting fluid flow through the conduit and restriction back to cylinder 12a.

Figure 2:
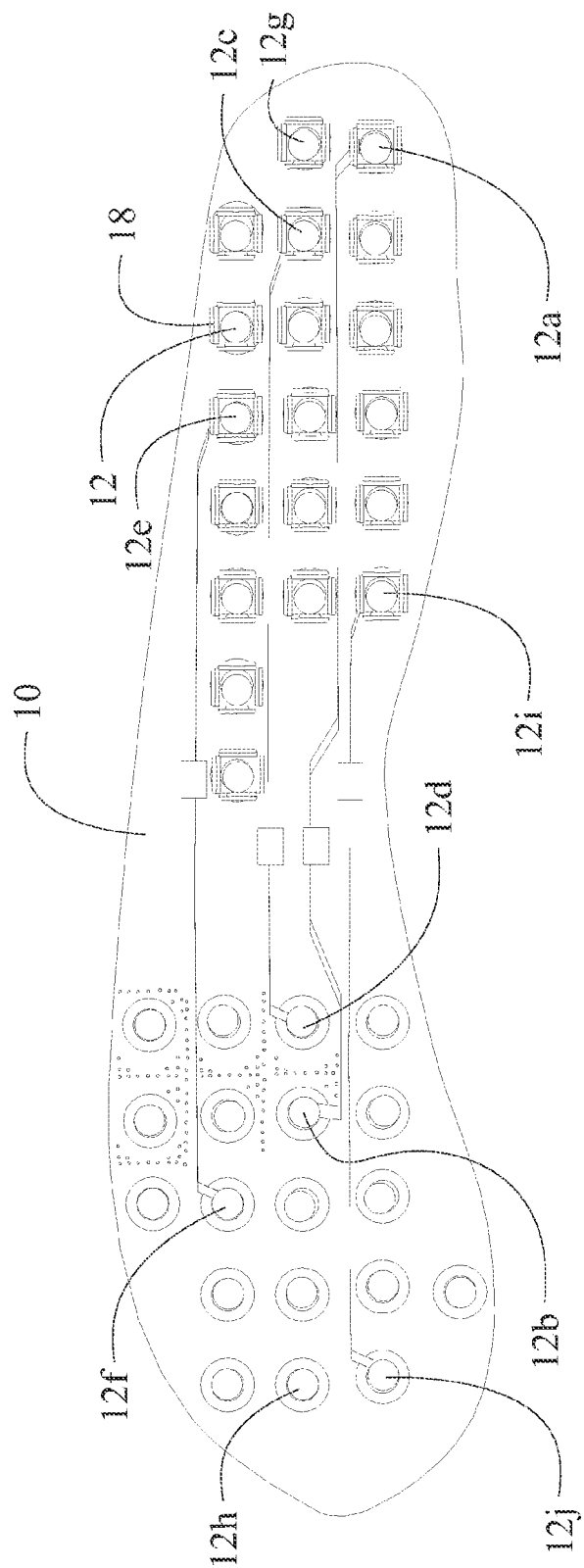
FIG. 2 is a top view of the embodiment shown in FIG. 1 with the foot bed removed for clarity.

FIG. 2 shows exemplary cylinder matching pairs with associated fluid conduits. For the described embodiment of cylinders 12 a, 12 c 12e and 12 g, are arranged in a first row immediately adjacent the heel boundary of the sole pad. Matched cylinders 12b, 12d, 12f, and 12h, are located at the ball of the foot. Cylinder 12i is located at the forward extremity of the heel portion of the sole pad with mating cylinder 12j located at the forward periphery of the toe portion of the sole pad. In a working embodiment every compression cylinder 12 is matched with a second cylinder through an associated fluid conduit 14 with optional flow restrictor 16. For the embodiment shown flow restrictor 16 is a separate element. In alternative embodiments flow restriction is accomplished by sizing of the cross-sectional area in the conduit over its length or integral forming of an orifice or nozzle in the conduit.

In order to equally distribute forces upon the chambers, durable plastic or metallic plates may be placed dorsally or volarly about the hindfoot and forefoot chambers. In addition, selective placement of cylinders may be accomplished allowing detailed control of energy transfer within the shoe structure (selective redistribution of forces) to accommodate various pronation issues and to maximize the desired energy dissipation through maximizing the length of the fluid conduits based on the foot strike profile. Matching of cylinders located under the ball of the foot with cylinders located under the toes would accommodate strike of the ball with roll through the toes for completion of the stride. In a running shoe, cross training shoe, or hiking shoe, as examples, heel strike is far more likely and matching of cylinders in the heel and toe portion may be optimal. With a basketball shoe or court shoe, cylinders on the interior and exterior of the sole may be matched to accommodate torsional effects from rapid sideways motion or pivoting on the foot. Extending the compression effect over a region of the individual cylinders may be accomplished by including rigid portions or plates in the foot bed in the heel and toe regions.

Figure 3:
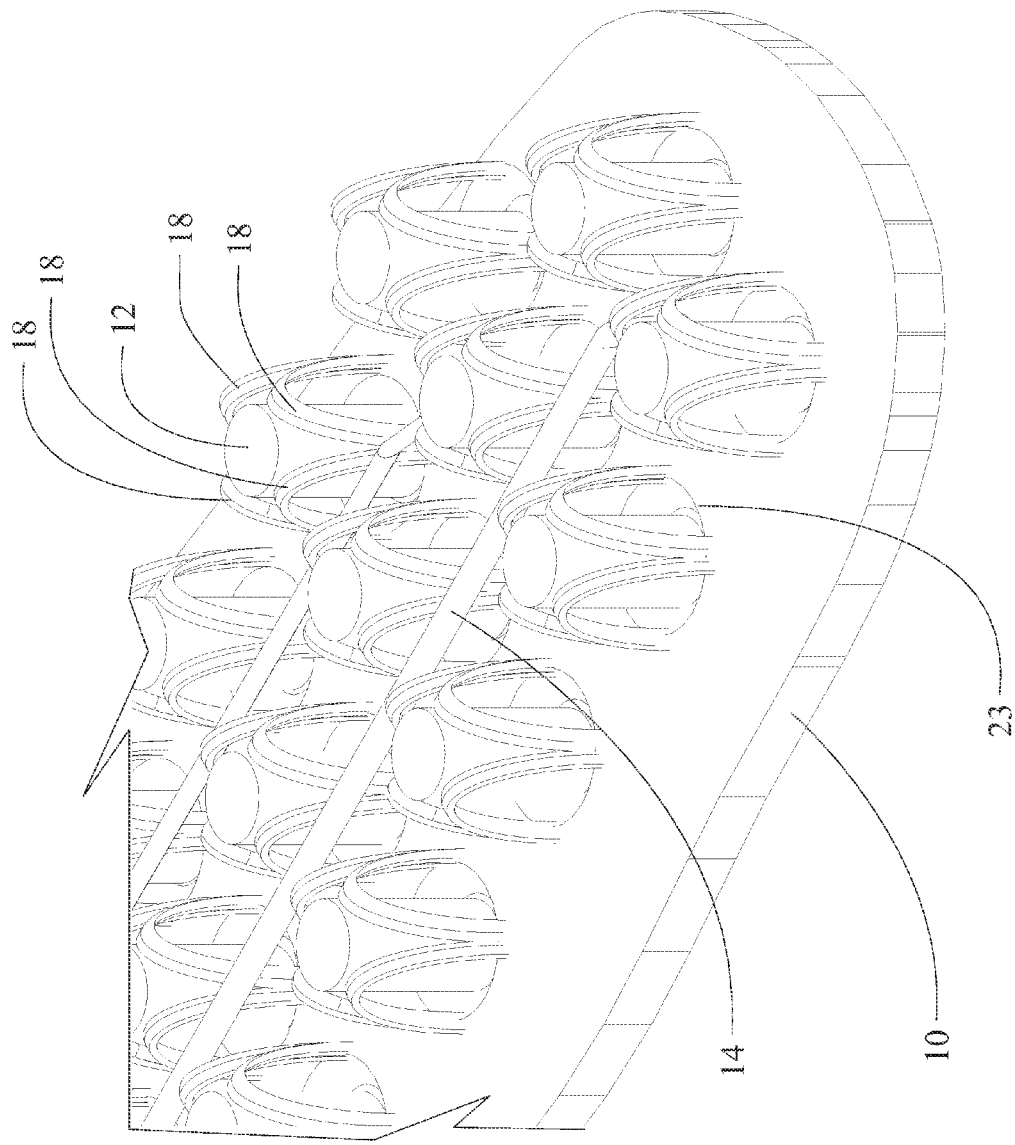
FIG. 3 is a detailed partial view showing structural elements of the first embodiment of the invention including compression cylinders and arcuate resilient members.
Figure 4:
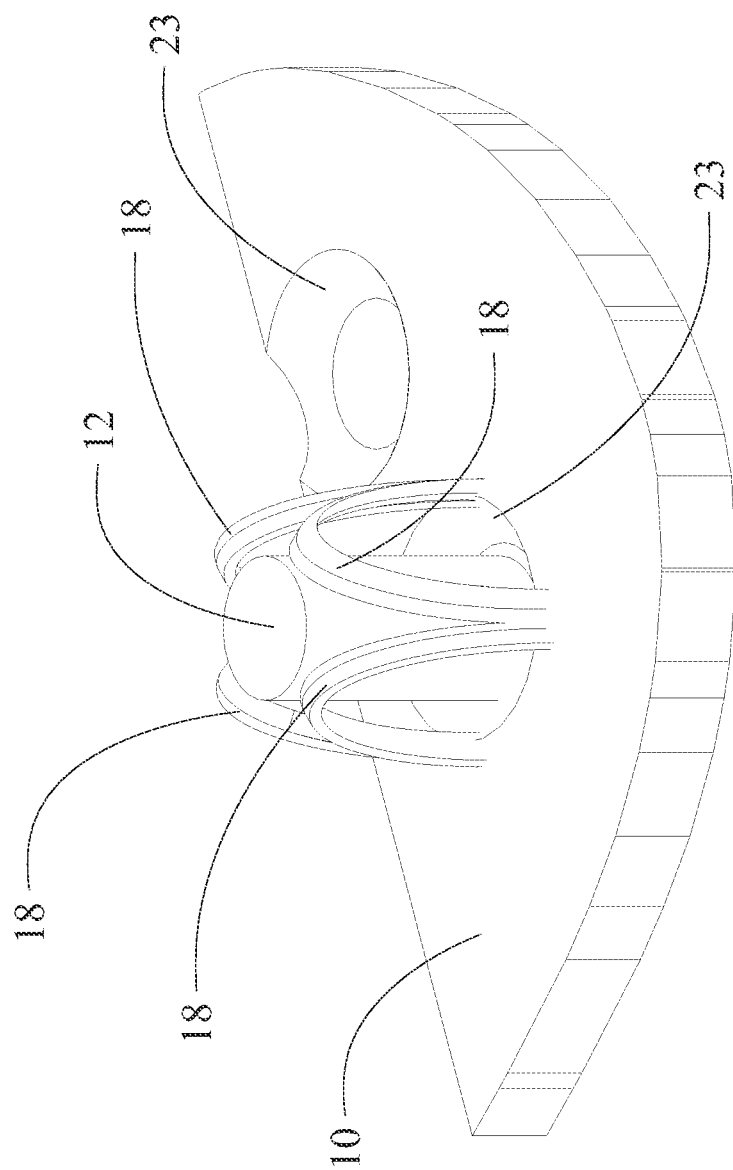
FIG. 4 is a detailed view of a single compression cylinder and associated arcuate resilient members.

FIG. 2 additionally shows supplemental structural elements employed in the embodiment disclosed in the drawings. Additional restoring force and impact attenuation in the resilient cylinders is provided by arcuate resilient members 18. For the embodiments shown, it is anticipated that heel strike will be site of applied force and the arcuate resilient members surround cylinders in the heel area. Greater detail with respect to placement and appearance of the arcuate members is shown in FIGS. 3 and 4. For the embodiment shown each cylinder is surrounded by four orthogonally placed arcuate resilient members. The embodiment shown in FIG. 2 and FIG. 3 employs spacing of the compression cylinders with a separate set of four arcuate resilient members for each cylinder. In embodiments with regular spacing of the compression cylinders single intermediate arcuate members may be employed between adjacent compression cylinders. The arcuate members may be formed as a portion of the sole pad molding process with the cylinders and associated fluid conduits inserted intermediate the arcuate members. As additionally shown for the embodiment in the drawings, the sole pad and foot bed may employ molded depressions 23 to individually seat the cylinders.

During foot strike compression of the cylinders is accompanied by resilient deformation of the arcuate members. Upon removal of the compression force relaxation of the compressed arcuate members enhances recovery of the compressed cylinder. For the embodiment shown the arcuate members provide restoring force against a foot bed as will be described in greater detail subsequently. In alternative embodiments the arcuate members are adhesively attached or integrally formed with the compression cylinders to provide direct restoring force to the compression cylinder during relaxation of the deformed arcuate members.

Figure 5:
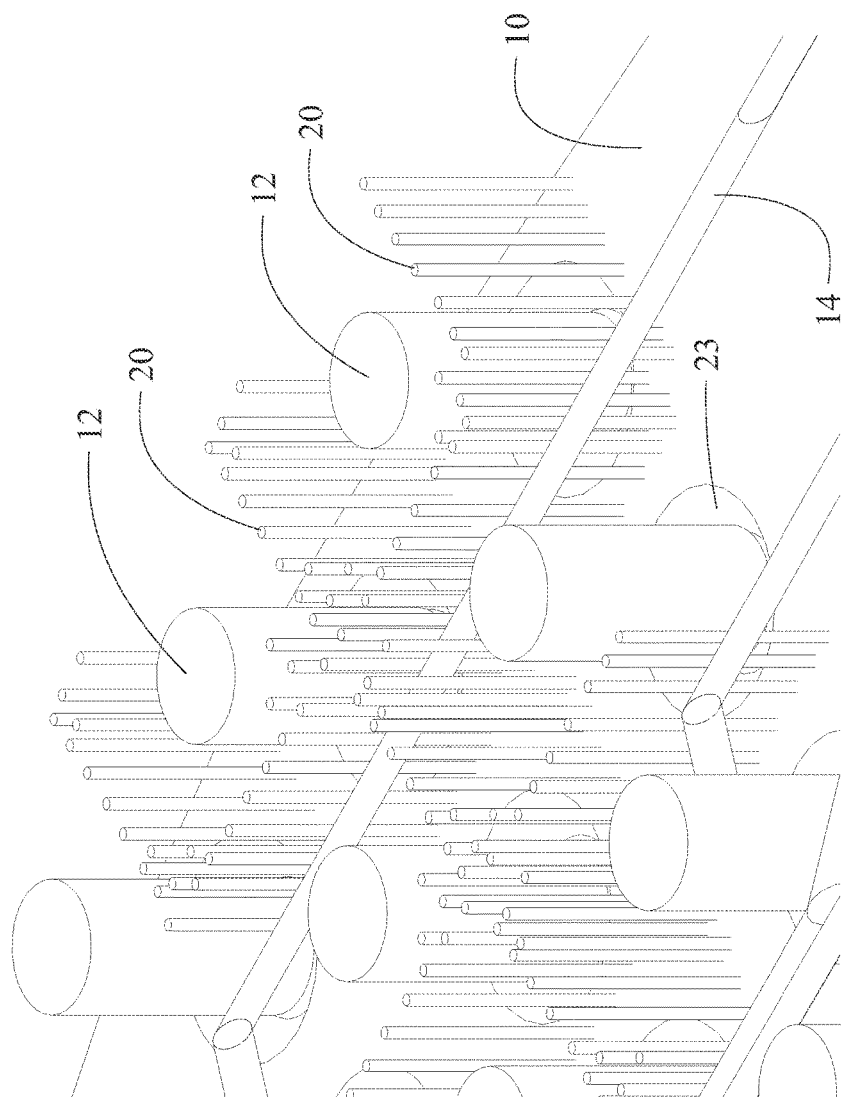
FIG. 5 is a detailed isometric view of an embodiment of the invention including a single compression cylinder and multiple resilient filaments.

FIG. 5 shows an additional embodiment for a supplemental energy absorbing structure. Upstanding resilient filaments 20 are provided between the compression cylinders. During foot strike, deformation of the resilient filaments assists in energy dissipation and upon release relaxation of the deformed filaments provides restoring force against the foot bed as previously described for the arcuate members. While shown in FIG. 5 as present in the toe portion of the shoe, the upstanding filaments may be positioned in the heel portion as shown in FIG. 7C, which will be discussed in greater detail subsequently. In selected embodiments the upstanding filaments are used in combination with the arcuate resilient members and may be used for providing resilient structural separation of the foot bed and sole pad intermediate compression cylinders where arcuate members are not employed. For the embodiment shown in the drawings the upstanding filaments are mounted to or integrally formed with the sole pad. In alternative embodiments the filaments may depend from the foot bed, may alternately extend from the sole pad and depend from the foot bed or constitute an interconnection between the sole pad and foot bed in a skeletal arrangement either by themselves or in combination with the compression chambers. These filaments as well as the arcuate filaments provide structural integrity for various other forces including shearing forces.

Figure 6:
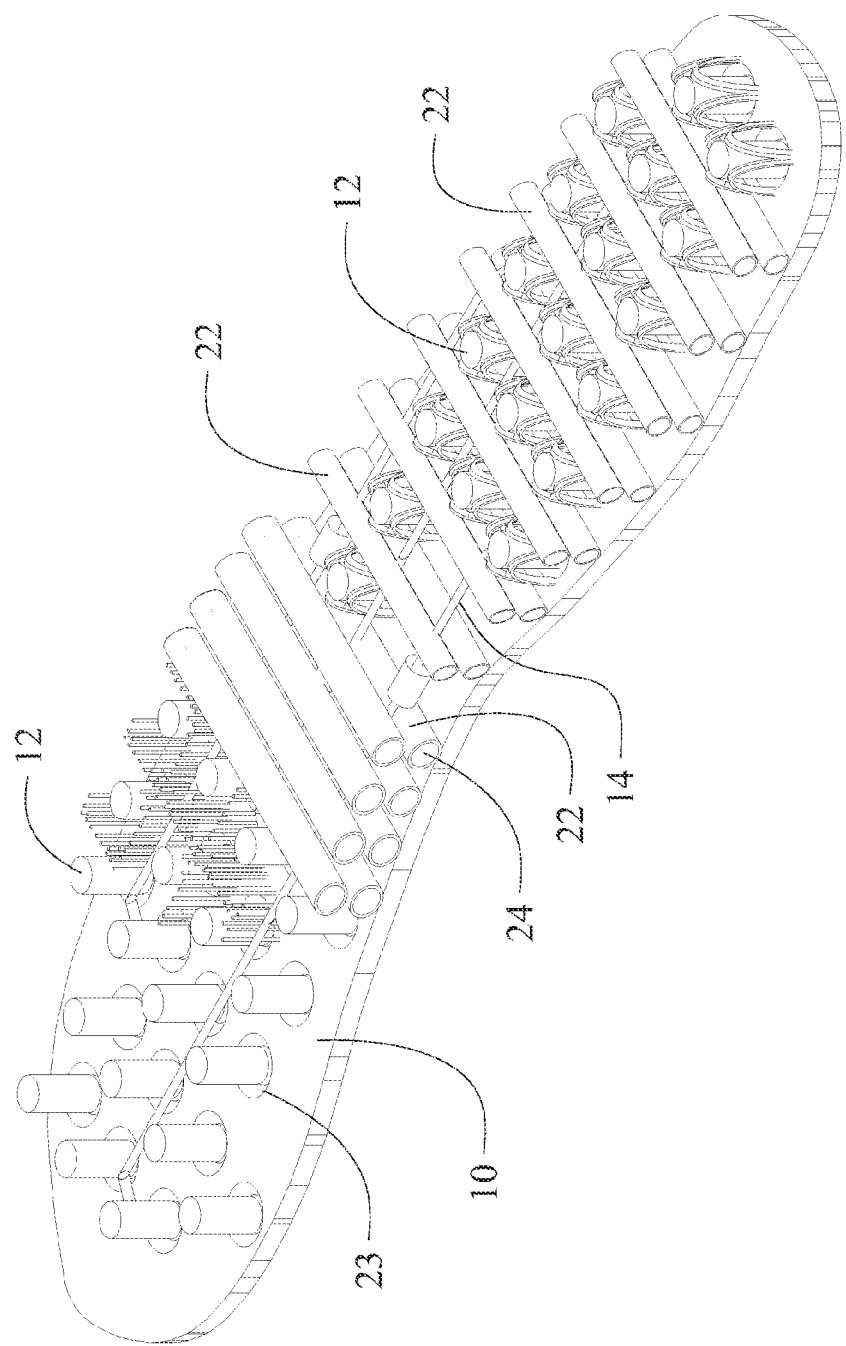
FIG. 6 is an isometric view of an embodiment of the invention incorporating lateral cooling tubes in a first configuration.

Referring to FIG. 6, cooling tubes 22 are mounted at various locations in the shoe transverse to a longitudinal axis of the sole pad. Compression and expansion of the cooling tubes during normal or walking or running action creates airflow through the open channels 24 in the tubes. Heat transfer through the transferred air allows cooling of the foot bed within the shoe for heat dissipation to the environment as well as attenuation of impulse by the electric recoil of the tubing (hoop strength and radial strength). As shown in FIGS. 7B and 7D to be described in greater detail subsequently, the overlying foot bed in combination with the sole pad joined by a peripheral wall 26 provides a cavity 28 in which a second working fluid is contained. Presence of the second working fluid in the cavity additionally assists the resilient structural members in providing support similar to cerebrospinal fluid surrounding the human brain. The working fluid is channeled between the compression cylinders, arcuate or filament resilient members, and the cooling tubes. The working fluid provides additional energy absorbing capability and impulse attenuation by flowing intermediate the various structural members during relative compression of the cavity between the foot bed and sole pad during normal walking or running motion. Additionally the working fluid, by bathing the compression cylinders, arcuate and filament resilient members and the lower surface of the foot bed, provides a conductive medium for additional heat transfer to the cooling tubes.

Figure 7A:
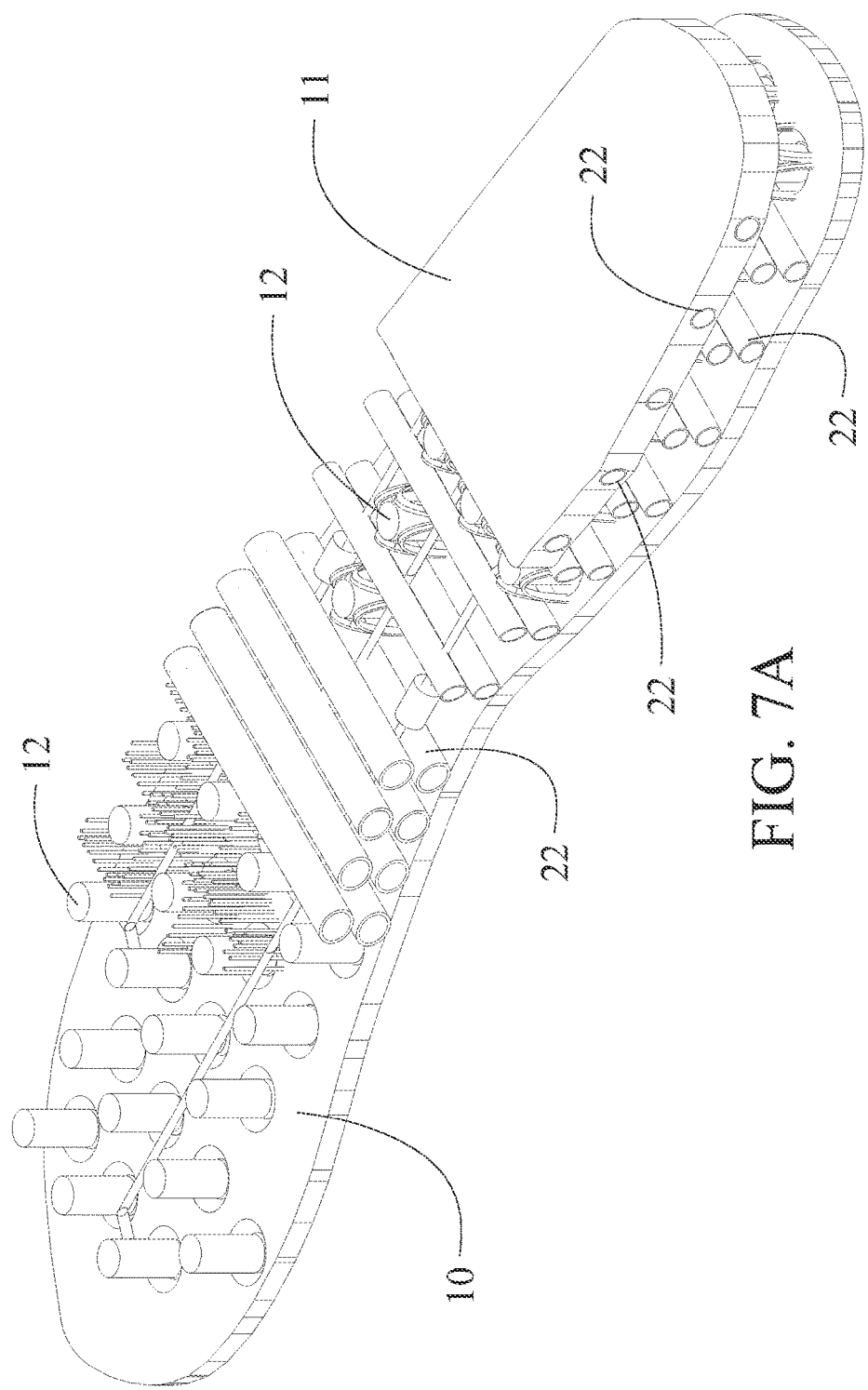
FIG. 7A is an isometric view of the embodiment of FIG. 6 including a heel portion of the foot bed with the remainder of the foot bed deleted for clarity in viewing of elements of the embodiment.
Figure 7B:
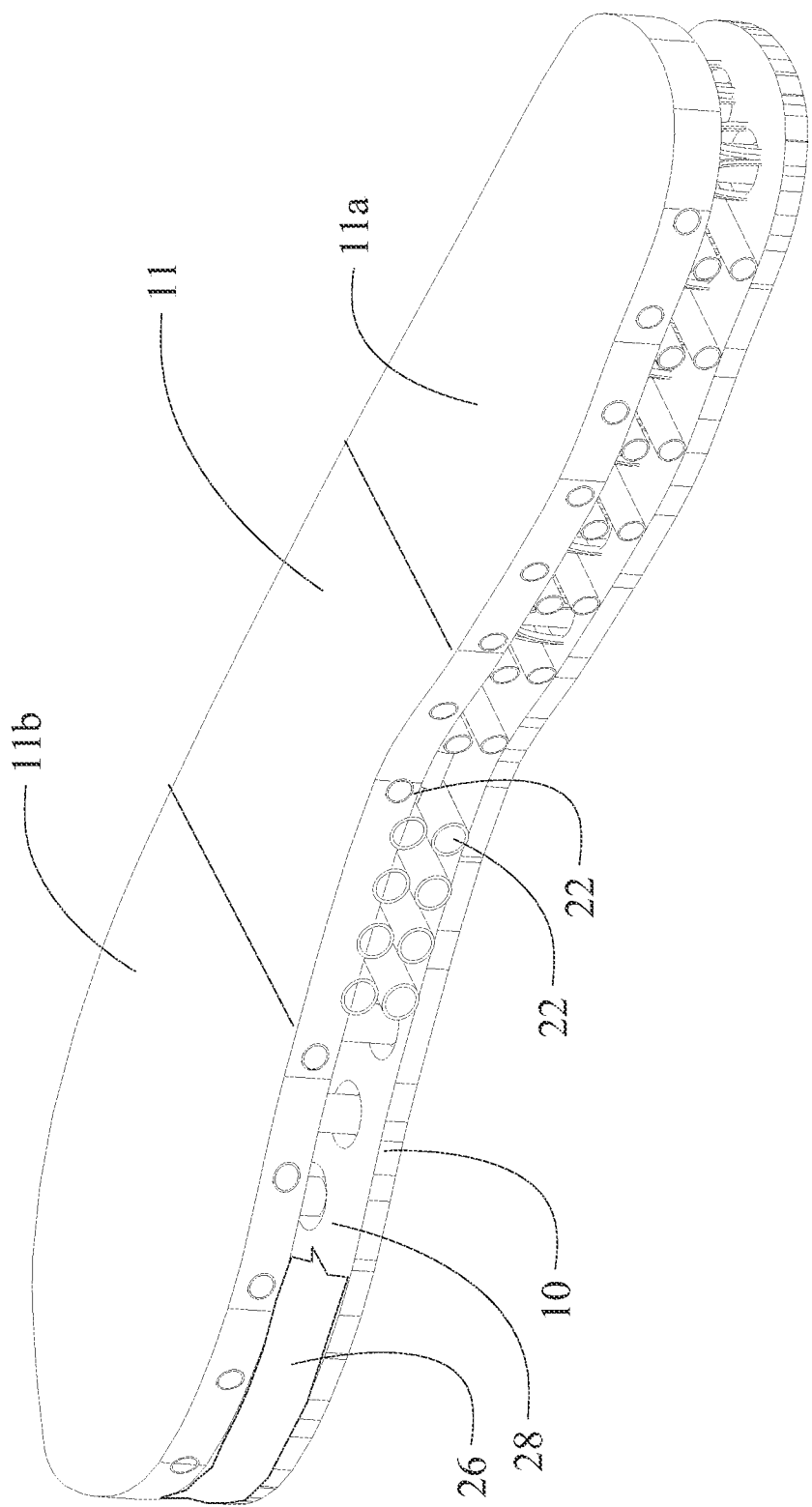
FIG. 7B is an isometric view of the embodiment of FIG. 6 including a the foot bed.
Figure 7C:
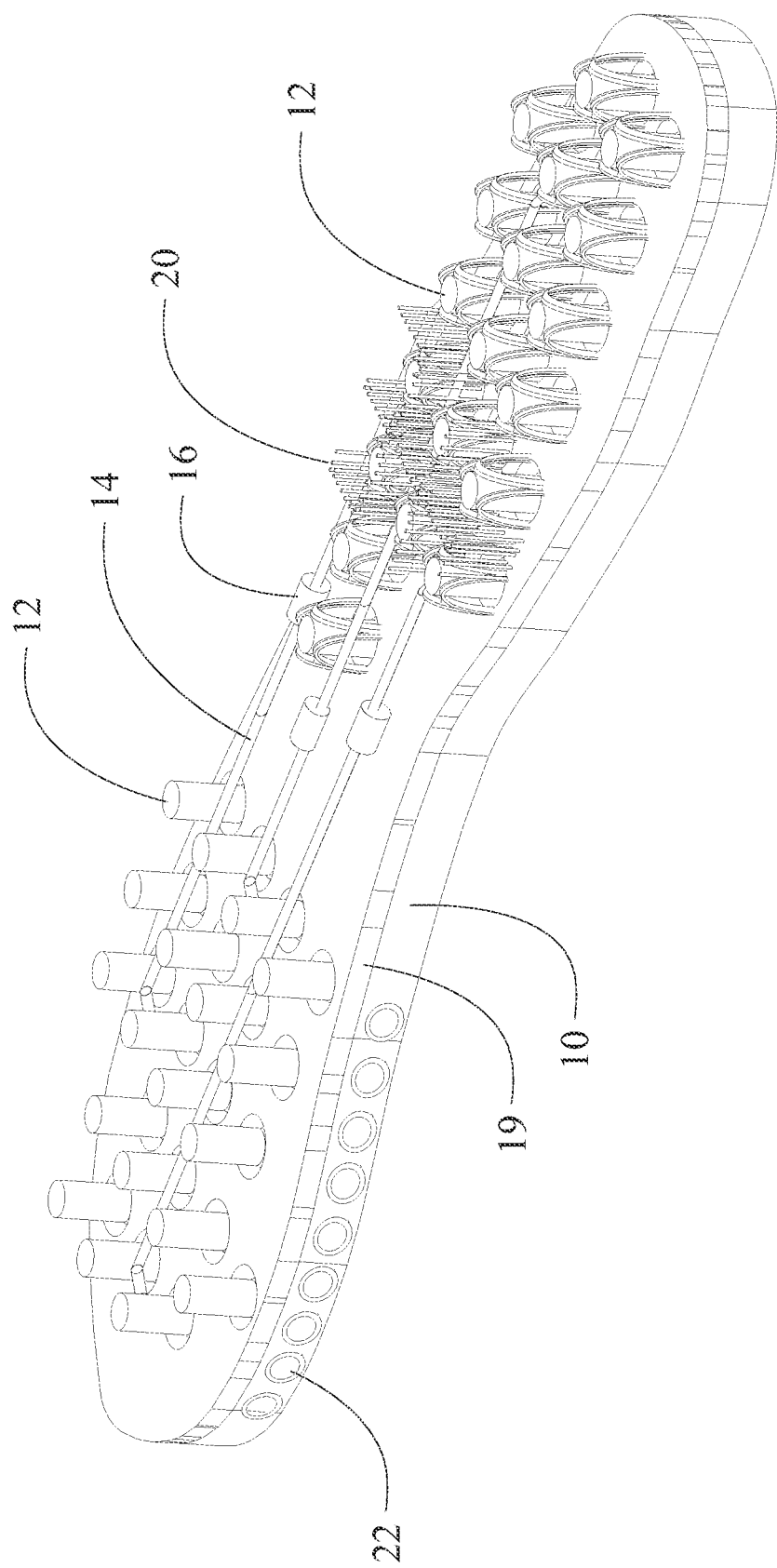
FIG. 7C is an isometric view of a modified embodiment of FIG. 6 with an alternative cooling tube configuration.
Figure 7D:
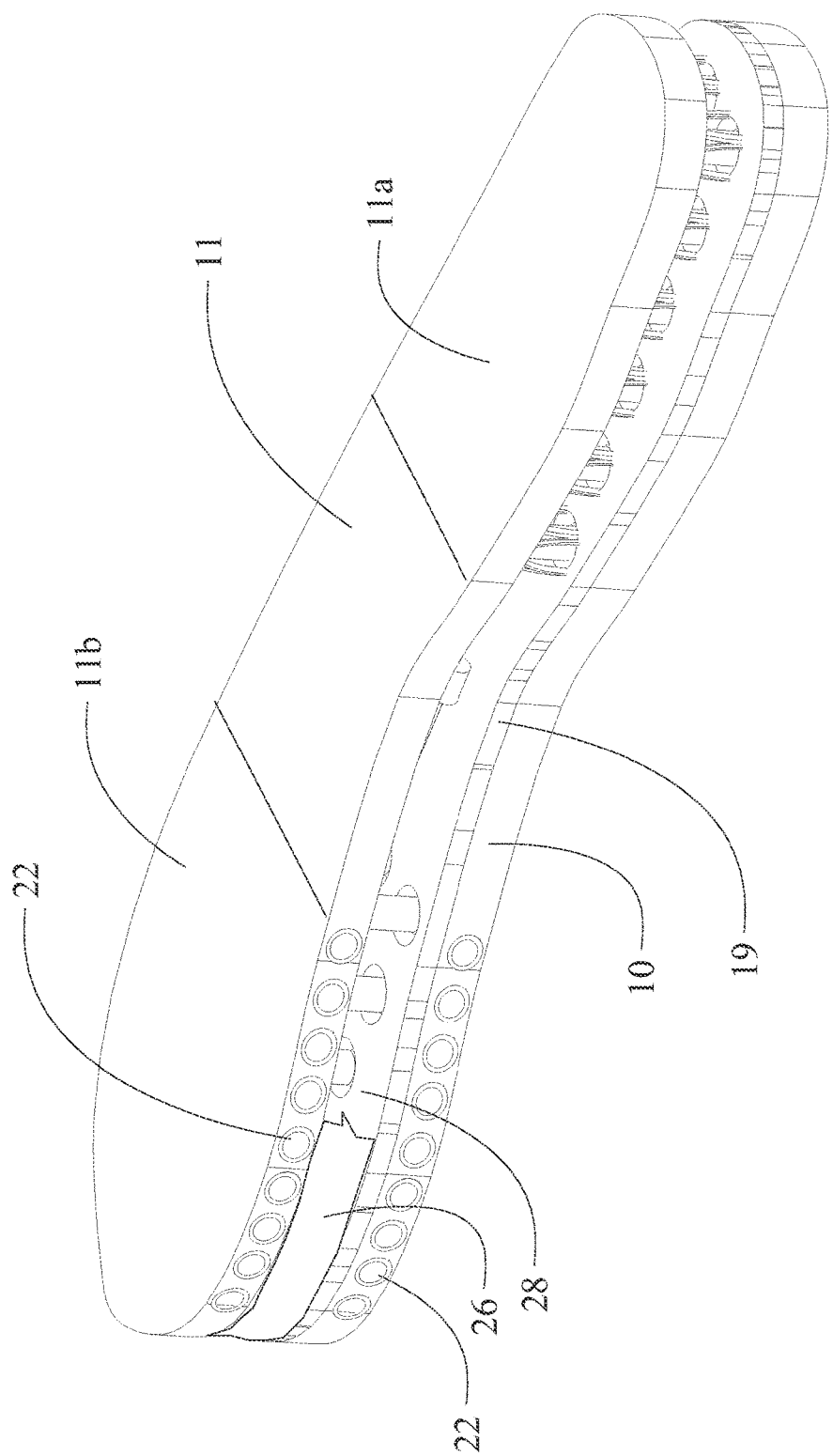
FIG. 7D is an isometric view of the embodiment of FIG. 7C with the foot bed in place.

For the embodiments shown in FIGS. 6, 7A and 7B a portion of the cooling tubes are placed directly adjacent and in thermal contact with conduits 14 for cooling of the first working fluid transferred intermediate the compression cylinders. Additionally, cooling tubes are placed immediately adjacent, laterally or vertically, and in thermal contact with the compression cylinders for direct supplemental cooling. In one exemplary embodiment cooling tubes are integrated in the sole pad or foot bed. The portion of the foot bed shown in FIG. 7A may be a separable heel plate 11a for distribution of the force of a heel strike over the compression cylinders in the heel portion of the shoe. A comparable toe portion of the foot bed may be similarly separated from the foot bed as a whole for a similar effect in the toe portion as designated by element 11b in FIG. 7B.

FIGS. 7C and 7D show an alternative configuration of the cooling tubes in the system wherein the foot bed and sole plate in the toe or heel portion of the shoe employ embedded cooling tubes for maximum contact and cooling of the second working fluid. Heel strike results in displacement of the fluid into the toe portion from the compressed cylinders, fluid flow conduits and deforming resilient members. Intimate contact by the second working fluid with the top of the sole plate and bottom of the foot bed in the toe region and the placement of the cooling tubes immediately adjacent these surfaces allows maximum heat transfer from the working fluid to the environment by air exchange through the cooling tubes. In an advanced embodiment, a conduction plate 19 is employed in the top surface of the sole plate to enhance the heat transfer from the working fluid. While shown in the drawings only associate with the sole plate alternative embodiments employ a second conduction plate associated with the foot bed for enhanced conduction to cooling tubes in both the sole plate and foot bed. In addition to cooling, the tubes within the sole and foot bed attenuate the impulse of the applied force related to intrinsic radial strength (hoop strength) of the cooling tubes.

In an alternative embodiment, additional energy dissipation is accomplished through the use of an electromagnetic generation system shown in FIGS. 8, 9 and 10. A buoyant magnet 30 floats in the first working fluid of an exemplary compression cylinder 12a. An inductive pickup coil 32 is wrapped around the external surface of the compression cylinder for the embodiment shown. In alternative embodiments, the coil is encased or molded into the cylinder wall. During compression of the cylinder created by foot action as previously described the first working fluid is forced from the cylinder through conduit 14 and the magnet moves axially in the cylinder creating a current in the induction coil. Current generated is resistively dissipated as will be described in greater detail subsequently. For the embodiment shown in the drawings the mating cylinder 12b is similarly structured but incorporates an inductive coil 34 with opposite polarity to coil 32. Fluid flowing through conduit 14 and restrictor 16 urges the buoyant magnet in cylinder 12b upwardly. Interaction between the buoyant magnet in cylinder 12b and inductive coil 34 provides additional energy dissipation through a combination of both electromagnetic driving force from the current created by coil 32 and reversed EMF created by motion of the buoyant magnet. Resistance of the interconnecting wires 36 and 38 between the two inductive coils may be increased by the use of additional resistive elements. While embodiment shown in the drawings employs two coils, use of a single coil on one compression cylinder with a resistive wire loop extending from the coil provides the desired energy dissipation in alternative embodiments.

In addition, the embodiment shown in the drawings provides a parallel fluid conduit 14' with an integral restrictive element 16' for transfer of the working fluid the use of two conduits allows two fluid flow paths which may be associated with interconnecting electrical wires 36 and 38 respectively. Heat generated by the resistive dissipation of the induced current is transferred to the second working fluid. Intimate contact of the wires and any associated resistive elements with the fluid conduits allows enhanced heat conduction from the resistive dissipation of the electromagnetically created current. The wires are shown separate from and mounted to the surface of the conduits in the embodiments of the drawings, however, in alternative embodiments, the wires may be integrally molded into the conduit walls. As described for the embodiments of FIGS. 6 and 7 bathing of the electrical wires and first working fluid conduits in the second working fluid provides dissipation of the heat generated through the cooling tubes.

While the embodiments shown in FIGS. 8, 9 and 10 employ an induction coil integrally mounted to the compression cylinder, alternative embodiments employing a separate coil concentric with the compression cylinder. The coil may take the form of a resilient spring mounted intermediate the foot bed and a sole pad thereby providing additional energy dissipation during relative compression created by foot strike.

As best seen in FIG. 10, a repelling magnet 40 is mounted in the base of compressible cylinder 12a. The repelling magnet has an opposite polarity to the buoyant magnet and provides magnetic repulsion to reduce or preclude bottoming of the buoyant magnet in the compressible cylinder during foot strike. The repulsion force between the two magnets provides further energy dissipation for the foot strike compressing cylinder 12a. In other embodiments a capacitor can be inserted into the circuit and the created EMF can be stored for various uses such as cell phone charging.

Figure 11:
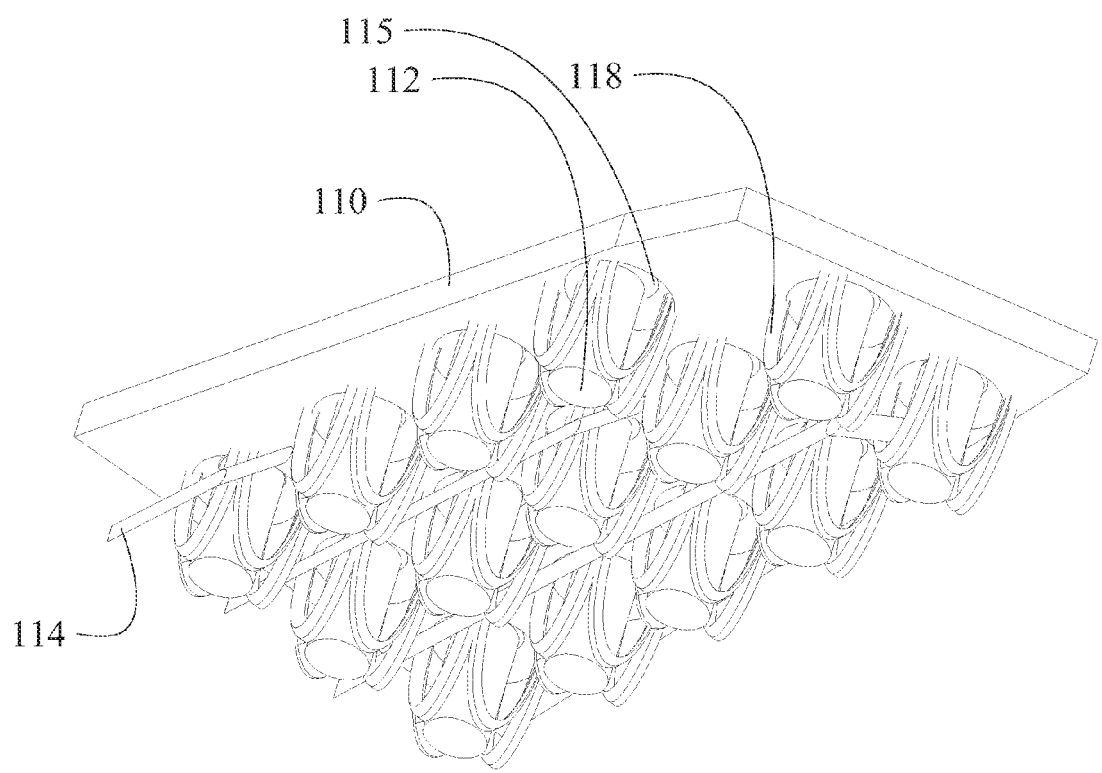
FIG. 11 is an isometric view of a first embodiment of a generalized shock absorbing pad employing the technology without the liner shown for clarity.

The impact absorbing capability of the present invention is employed in alternative embodiments for dissipating impact in such sports equipment as pads or helmets. As shown in FIG. 11, pad 110 which in various embodiments is a pad liner or helmet liner includes compression cylinders 112 constructed from resilient material such as natural or synthetic rubber and having a central void, as previously described with respect to the shoe embodiments of the invention, extend from the pad. In an exemplary embodiment as shown in the drawings, the void in each compression cylinder is filled with a first working fluid. In alternative embodiments, no gas working space remains in the cylinder and the walls of each cylinder are substantially collapsible Fluid conduits 114 extend from each pad for transport of the working fluid as will be described in greater detail with respect to FIG. 13.

Additional restoring force in the resilient cylinders may be provided by arcuate resilient members 118. For the embodiment shown each cylinder 112 is surrounded by four orthogonally placed arcuate resilient members. The embodiment shown employs spacing of the compression cylinders with a separate set of four arcuate resilient members for each cylinder. In embodiments with regular spacing of the compression cylinders single intermediate arcuate members may be employed between adjacent compression cylinders. The arcuate members may be formed as a portion of the pad molding process with the cylinders and associated fluid conduits inserted intermediate the arcuate members. As additionally shown for the embodiment in the drawings, the pad may employ molded depressions 115 to individually seat the cylinders.

During impact against the pad, compression of the cylinders against the protected body part (or an inner liner shown as the foot bed in the shoe embodiments) causes fluid displacement through the fluid conduits and is accompanied by resilient deformation of the arcuate members. Upon removal of the compression force relaxation of the compressed arcuate members enhances recovery of the compressed cylinder. For the embodiment shown the arcuate members provide restoring force against a liner as will be described in greater detail subsequently. In alternative embodiments the arcuate members are adhesively attached or integrally formed with the compression cylinders to provide direct restoring force to the compression cylinder during relaxation of the deformed arcuate members.

Figure 12:
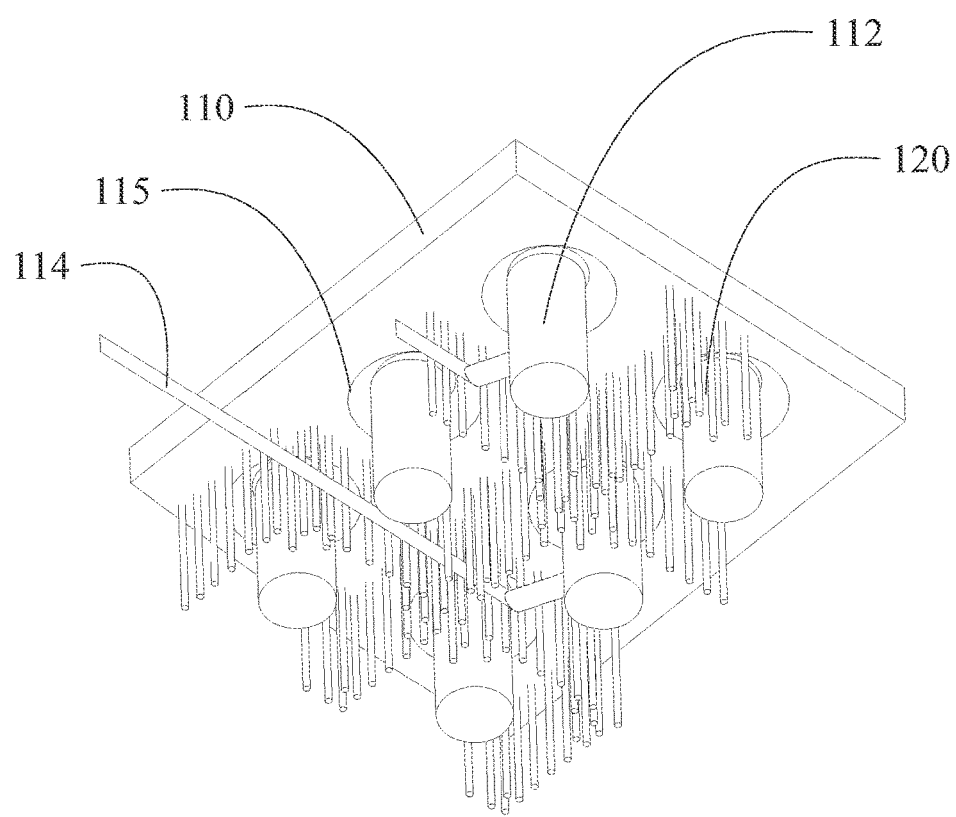
FIG. 12 is an isometric view of a second embodiment of a generalized shock absorbing pad employing the technology.

FIG. 12 shows an additional embodiment for a supplemental energy absorbing structure. Upstanding resilient filaments 120 are provided between the compression cylinders. During impact, deformation of the resilient filaments assists in impact attenuation and upon release relaxation of the deformed filaments provides restoring force against the liner as previously described for the arcuate members. In selected embodiments the upstanding filaments are used in combination with the arcuate members and may be used for providing resilient structural separation, integrity and support of the liner and pad intermediate compression cylinders where arcuate members are or are not employed. For the embodiment shown in the drawings the upstanding filaments are mounted to or integrally formed with the pad. In alternative embodiments the filaments may depend from the liner, may alternately extend from the sole pad and depend from the liner or constitute an interconnection between the pad and liner in a skeletal arrangement. The arcuate and/or upstanding filaments provide structural support to the system against stress or shearing forces.

Figure 13:
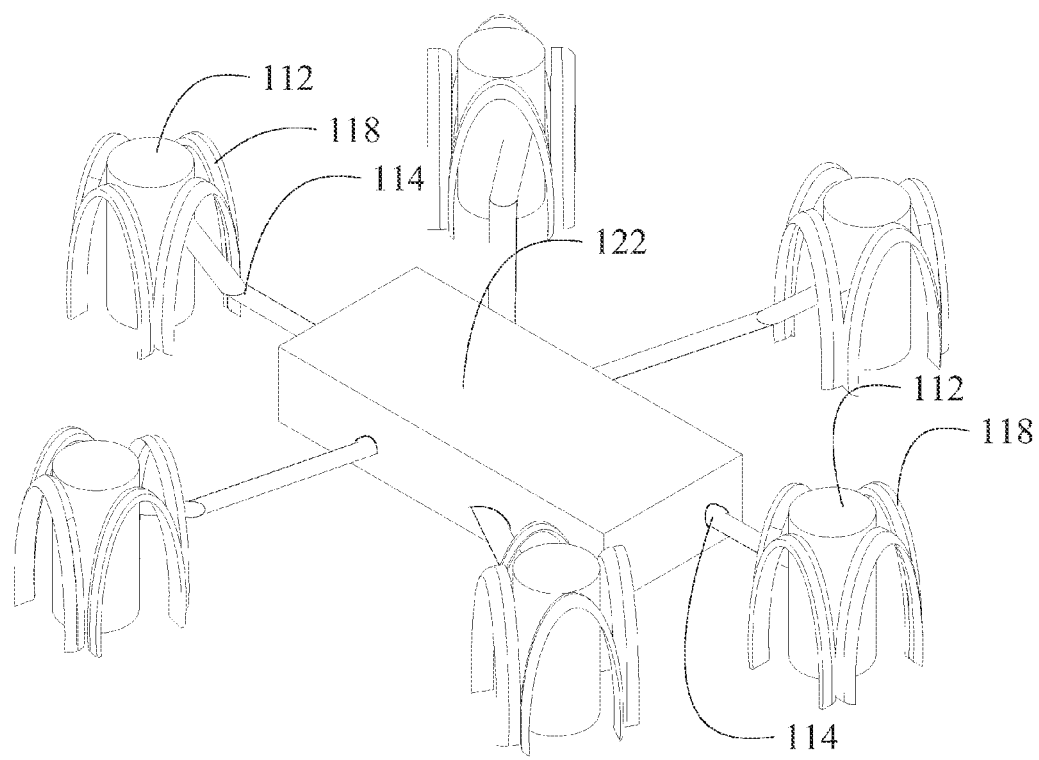
FIG. 13 is a block representation of an energy absorption system employing the embodiments of FIG. 11 or 12 connected to an accumulator.

As shown in FIG. 13, the conduits 114 extending from the cylinders 112 are routed to an accumulator 122. For the embodiment in the drawing a single accumulator is used, however, multiple accumulators may be employed. The accumulator may be rectangular, cylindrical (with circular or ovoid cross section) or other appropriate geometric shape. The previously described shoe embodiments allow transfer of fluid between cylinders in differing locations in the sole to allow for rock through in stepping motion or similar processes to transfer fluid between cylinders. In many applications, alternating impact or pressure on differing regions of the pad may not be present and after an impact, replacement of the working fluid in the cylinders is required. Use of a pressurized accumulator to receive working fluid from the compressing cylinders during impact then allows expulsion of the fluid from the accumulator back into the cylinders after resolution of the impact for refilling in preparation for subsequent impact events. In a helmet embodiment as an example, the accumulator could be placed at the nape of the neck on the helmet rim to receive fluid from cylinders spaced throughout the helmet. An example accumulator may employ a pressure cylinder with an inner bladder connected to the conduits. A pressure pad of inert gas such as nitrogen may then be provided between the pressure cylinder and bladder. In the prior disclosed embodiments for the shoe structure, the cylinders distally located from the impact absorbing cylinders act as the accumulators and pressure provided on those cylinders by the foot roll through creates pressure for the reversing flow.

Figure 14:
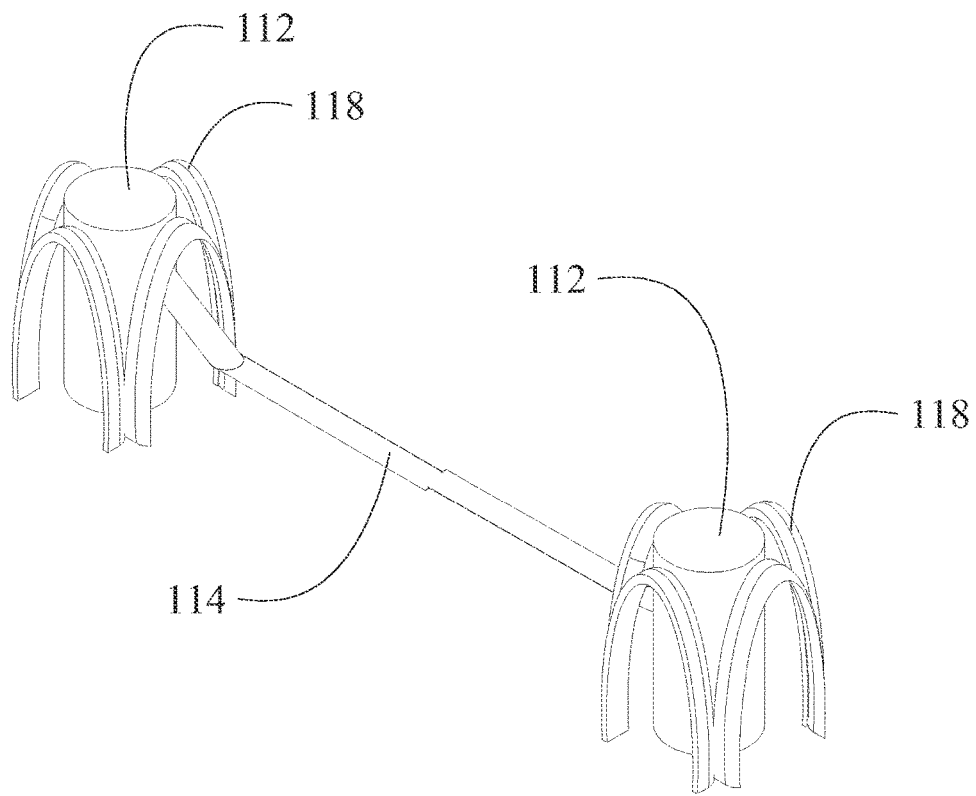
FIG. 14 is a block representation of an energy absorption system employing the embodiments of FIG. 11 or 12 with mating cylinders acting as the accumulator

In alternative embodiments as shown in FIG. 14, the conduits 114 may interconnect cylinders in differing locations on the pad which are unlikely to have simultaneous impact and the cylinder material is sufficiently flexible to allow expansion of the cylinder not in the impact zone to accommodate fluid flowing from the impacted cylinder(s). Resilient contraction of the expanded cylinder(s) then forces the working fluid back through the conduit to expand the cylinder(s) compressed by the impact. As described with respect to the representative shoe embodiments, a second working fluid surrounding the chambers, conduit tubing, filaments, pillars and accumulator may or may not be employed.

For the embodiments described, numerous cylinders can be placed in a circumferentially dispersed manner about a central reservoir acting as the accumulator with conduits connecting each cylinder with the reservoir. Filaments, either arcuate or pillar in form, as previously described, may be placed around the cylinders and/or reservoir. Upon compression by an applied force, the cylinders will displace fluid through the conduits into the central reservoir. The filling and expansion of the central reservoir will crate a positive pressure which will assist in refilling the cylinders upon removal of the force. In addition, the intrinsic recoil of the cylinders as well as the surrounding filaments, if used, will help to re-expand the cylinders. The arrangement of the overall pattern may be circular, rectangular or any other desired shape. As shown in FIG. 13, the central reservoir is of lesser height and as the volume of displaced fluid increases, the pressure in the reservoir increases. The reservoir and chambers can be of any desired size. Grouping of cylinders and reservoirs, subsequently referred to herein as cells, may be employed. Plates, such as the liner in previously described embodiments, may be employed above or below, or both, the cells to equally distribute the applied force. The cells may be replaceable, individually or as a sheet, after repetitive impulses. The cells may or may not be surrounded by a second working fluid as previously described for additional absorptive properties similar to cerebral spinal fluid surround the human brain. As an additional means to restore the first working fluid to the chambers, for example in a helmet, the central reservoir can be pushed by the fingers after removal of the helmet. The location of the reservoirs can be made conspicuous.

Figure 15:
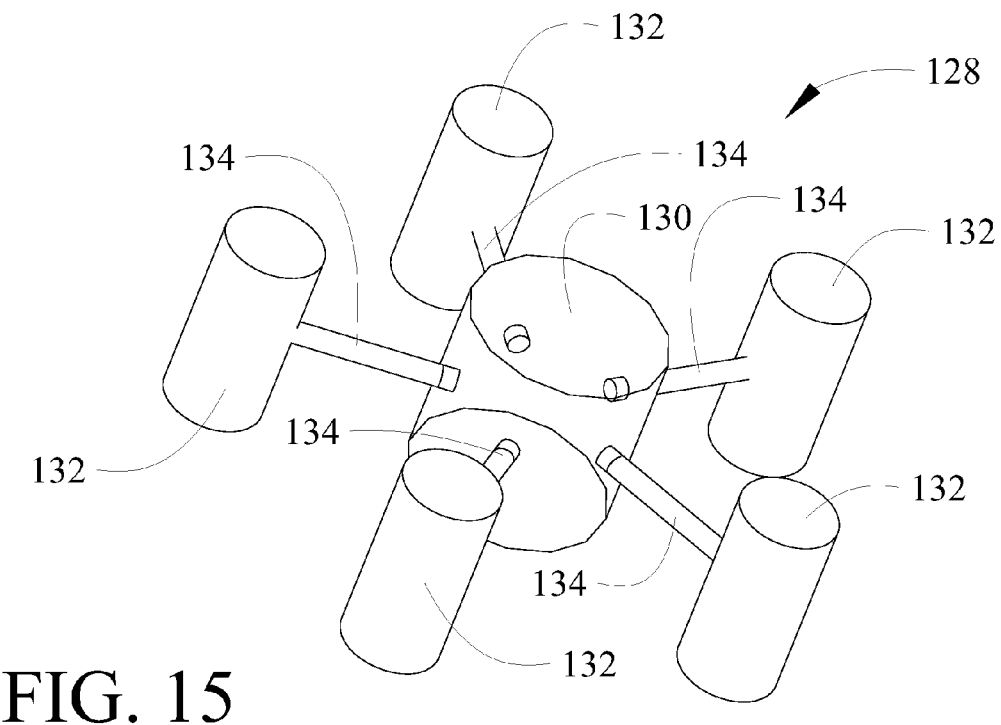
FIG. 15 is perspective view of a unitary cell employing multiple compression cylinders spaced around and in fluid communication with a central accumulator.

An example of the arrangement of the shock absorbing system into a unitary cell 128 is shown in FIG. 15. An accumulator or reservoir 130 is surrounded by multiple compressible cylinders 132 which are oriented substantially perpendicular to an impact surface, described in greater detail subsequently. For the embodiment shown a pentagonal arrangement of the compressible cylinders is shown, however, in alternative embodiments more or fewer cylinders may be associated with the reservoir. Each of the compressible cylinders 132 is in fluid communication with the reservoir 130 through conduits 134. Spacing of the cylinders and reservoir in FIG. 15 are exaggerated for clarity. As previously described, the reservoir and cylinders are filed with a first working fluid and upon shock or impact on one or more of the compressible cylinders 132 the cylinder(s) partially or fully collapse forcing the working fluid through the conduit into the reservoir 130. Reservoir 130 employs resilient materials to allow expansion due to pressure increase from transferred fluid. Upon release of the impact force from the compressible cylinder 132, the pressurized working fluid from reservoir 130 is forced back through conduit 134 to expand the compressible cylinder. As described for prior embodiments, a flow restriction may be employed in conduit 134 for control of the flow of working fluid.

Figure 16:
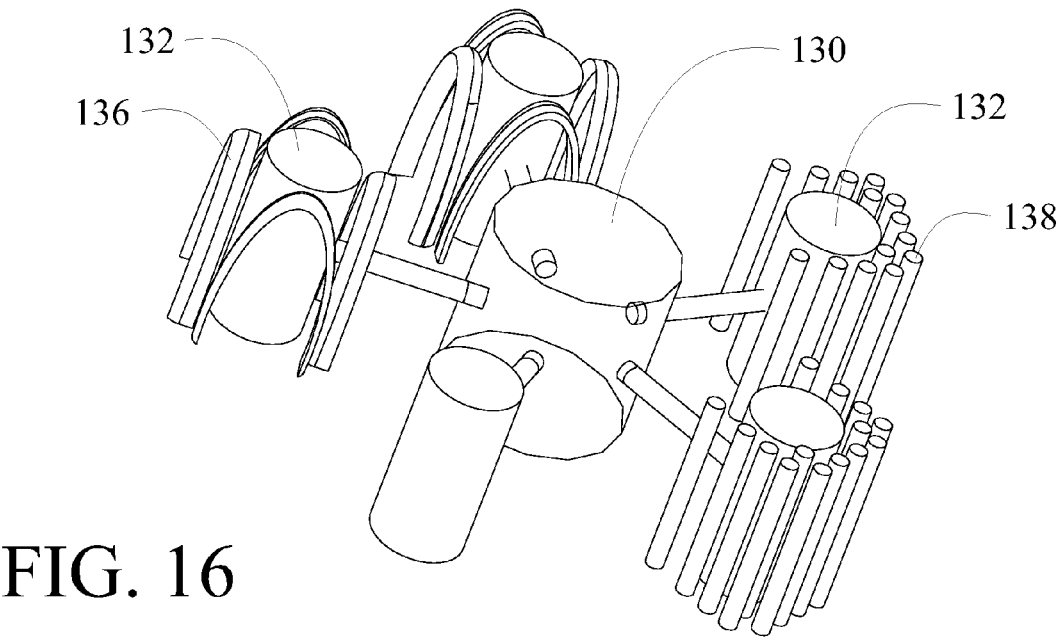
FIG. 16 is a perspective view of the unitary cell demonstrating additional resilient elements in either arcuate filament or vertical pillars.

Expansion of the compressible cylinders may be enhanced through the use of mechanical restoring elements to assist the hydrodynamic force from the pressurized reservoir in erecting the cylinder from a collapsed state. As shown in FIG. 16, arcuate filaments 136 may be employed to surround the compressible cylinders 132 as shown for two cylinders in the figure. As previously described for an earlier embodiment, the arcuate filaments may be substantially perpendicular to each other and surround the compressible cylinder. Alternatively, rod like upstanding filaments or pillars 138 may be employed to surround the cylinders 132 as shown for two cylinders in the figure. The arcuate filaments 136 or pillars 138 are resiliently flexible and oriented substantially perpendicular to the impact surface and also provide a cushioning or shock absorbing capability to supplement the compressible cylinders in attenuating the impulse. In addition, the arcuate filaments and pillars provide support against shearing forces. Upon deformation, the arcuate filaments 136 or pillars 138 resiliently return to their original shape thereby urging an envelope, upper plate or liner (as will be described subsequently) upward to assist in expansion of collapsible cylinders 132 with pressurized working fluid from the reservoir 130.

Figure 17:
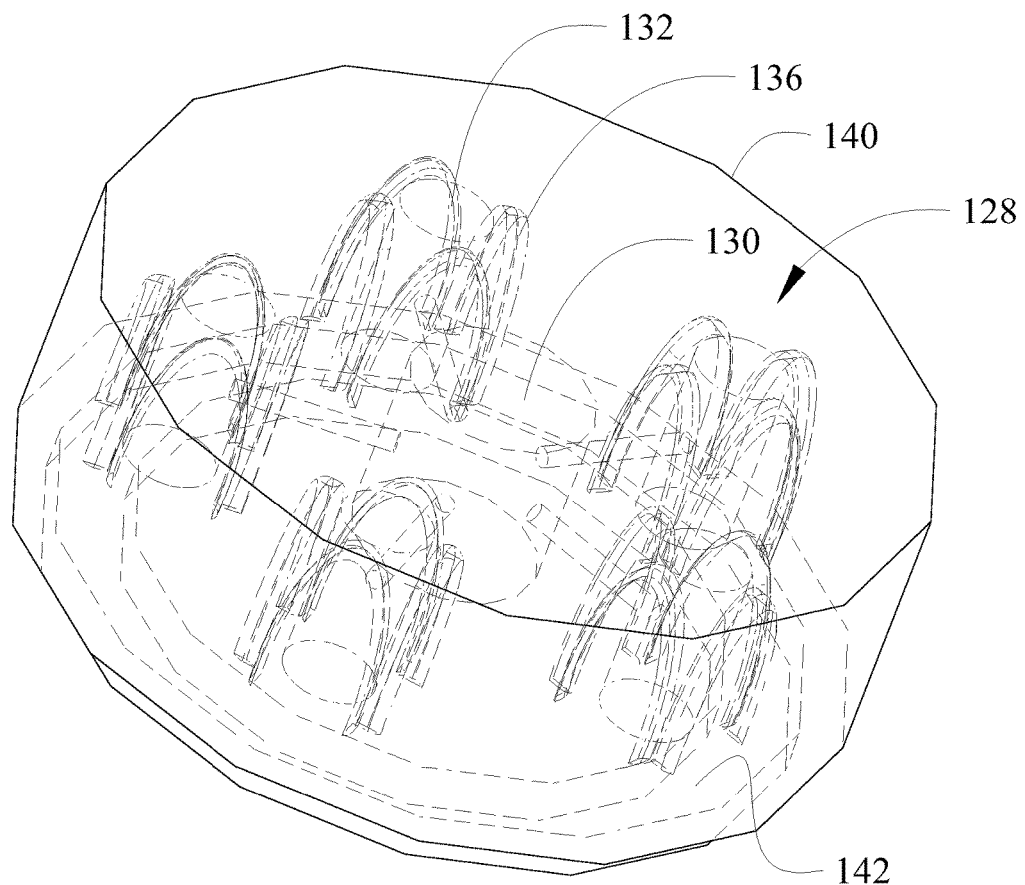
FIG. 17 is a perspective view of the unitary cell encapsulated in a membrane containing a secondary wording fluid.
Figure 18:
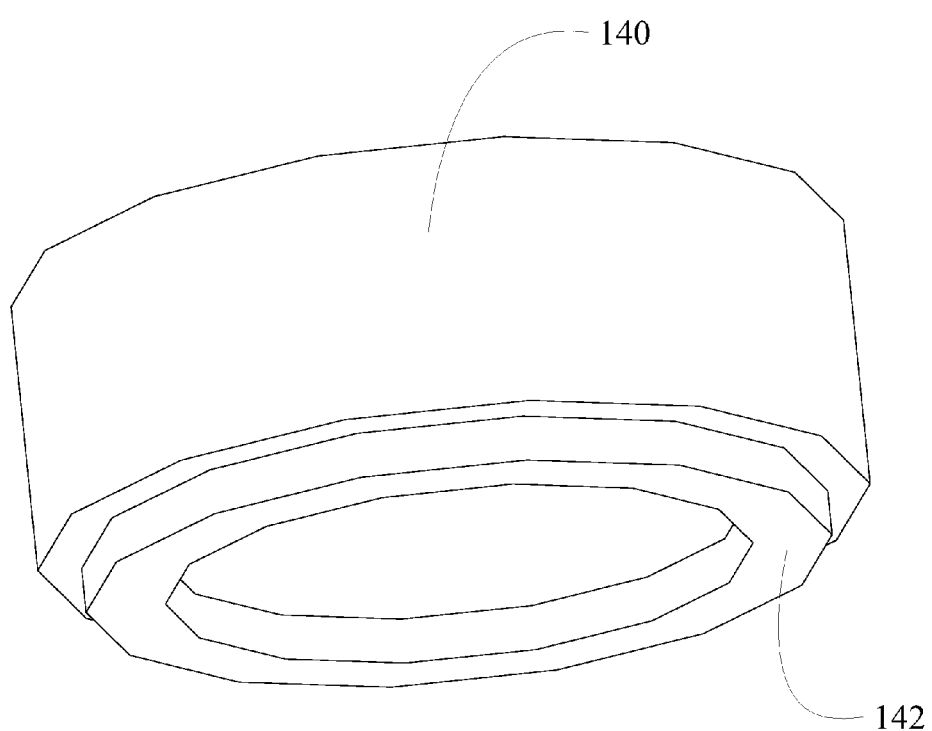
FIG. 18 is a lower perspective view of the membrane encapsulated unitary cell with a hook and loop fastener ring for attaching the cell to a wall of a helmet or impact pad.

The structure of the unitary cell 128 may be enhanced by encapsulating the reservoir 130 and associated compressible cylinders 132 in an envelope 140 as shown in FIG. 17. The envelope 140 may be a contiguous material such as a foam, rubber or elastomeric or may be a covering providing a chamber around the reservoir and cylinders which may be filled with a second working fluid (as will be described in greater detail subsequently). For the embodiment of FIG. 17 arcuate filaments 136 are employed to surround the compressible cylinders 132 as previously described. The arcuate filaments 136 provide restoring force acting on the envelope 140 to assist the expanding of the compressible cylinders after compaction as previously described. Pillars may be employed in conjunction with or to replace the arcuate filaments or no additional mechanical restoring elements may be employed. The encapsulated unitary cell 128 may then be affixed to a helmet shell, pad, wall, foot bed, liner or similar surface, wall or any structure for which shock absorbing capability is desired. For the embodiment shown, as an example best seen in FIG. 18, hook and loop fasteners 142 may be employed on one or multiple outer surfaces of the envelope 140 to accomplish the attachment and allow the removal of the unitary cell, as will be described in greater detail subsequently. Alternatively an adhesive for other form of attachment may be employed to bond the unitary cell to the surface. Pliable or severable adhesives may be employed to allow debonding of the unitary cell envelope from the surface.

Figure 19:
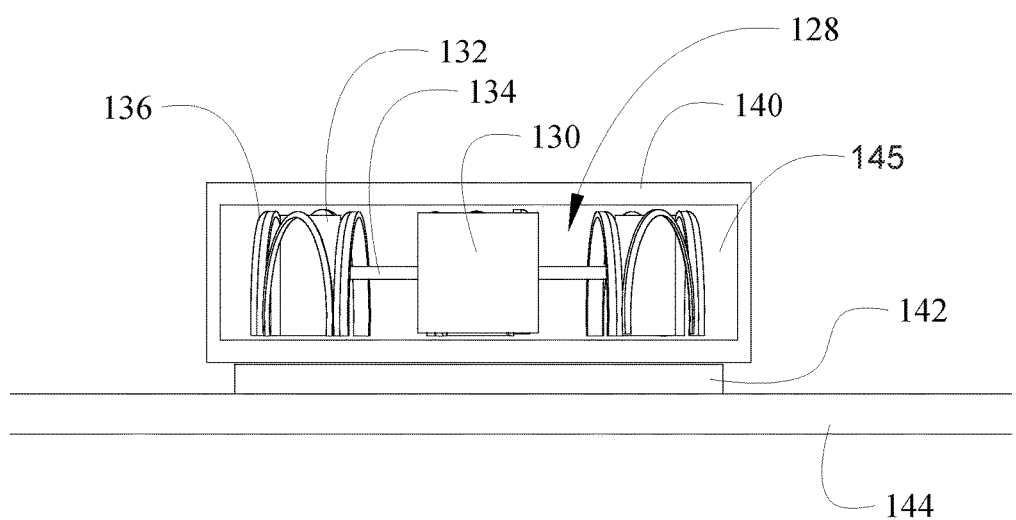
FIG. 19 is a side cross section view of the encapsulated unitary cell as attached to the wall.
Figure 20:
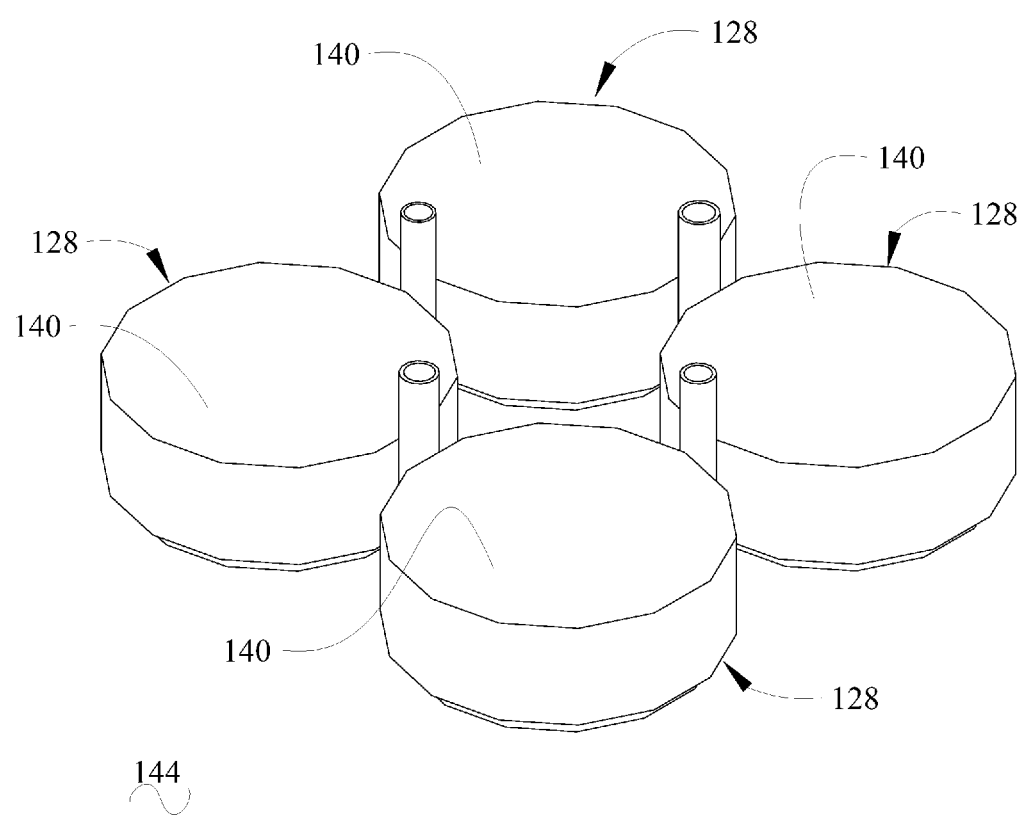
FIG. 20 is a perspective view of multiple unitary cells arranged with transverse cooling tubes.

FIG. 19 shows the unitary cell 128 attached to a surface 144. The envelope 140 is shown forming a chamber 145 in which a second working fluid may be contained. The second working fluid bathes the reservoir 130, compressible cylinders 132 and arcuate filaments 136 and may provide cooling, as will be described subsequently, or additional shock absorbing capability. Multiple unitary cells may be applied in a desired pattern to surface 144 as shown in FIG. 20; for example the interior surface of a motorcycle or football helmet or impact pad such as shoulder pads or shin guards for sports activities. The unitary cells may be attached using hook and loop fasteners on the envelope as previously described. While shown as a ring, the hook and loop fasteners may be employed as a patch and, in embodiments in which an envelope is not used around the compressible cylinders and reservoir of the unitary cell, the hook and loop ring or patch may be affixed directly to the cylinders and/or reservoir. Other types of adhesives can alternatively be used to attach the cells to the impact surface. The use of unitary cells removably attached to the surface as described allows removal and replacement if the compressible cylinders, reservoir or envelope should rupture or show excessive wear. The first working fluid may be colored and the envelope semi or fully transparent to allow easy recognition of a ruptured component.

Figure 21:
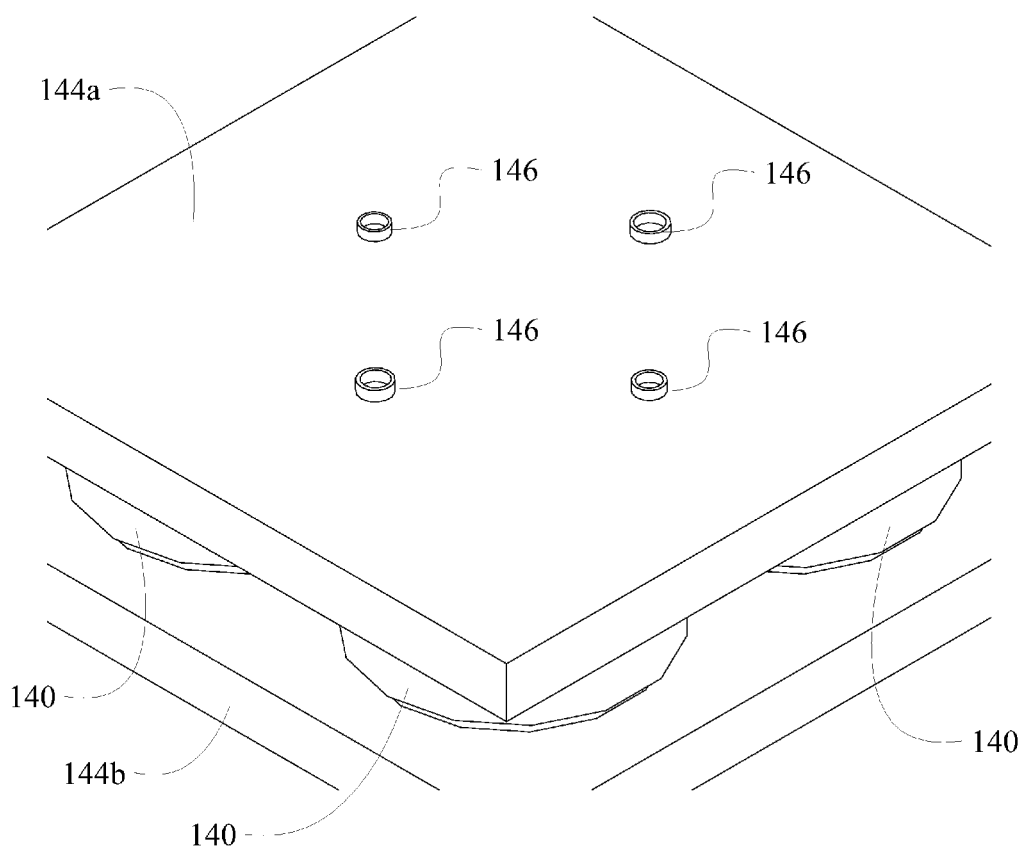
FIG. 21 is a perspective of a liner and bed surrounding the grouping of unitary cells with the extending transverse cooling tubes.

Cooling of the unitary cells 128 may be enhanced by the use of transverse cooling tubes 146. A first embodiment of the cooling tubes is shown in FIG. 20 wherein the tubes are located adjacent to and in intimate contact with the envelopes 140 of the unitary cells 128. As seen in FIG. 21, an upper plate 144a and lower plate 144b which may be such elements as an external surface of a helmet and a helmet liner or foot bed and sole liner which encompass the unitary cells may be pierced by the transverse cooling tubes 146 for ventilation. Heat transfer is provided through conduction between the envelopes 130, convection in the second working fluid in the envelope surrounding the reservoir and compressible cylinders, and convention of air through the transverse cooling tubes.

Figure 22:
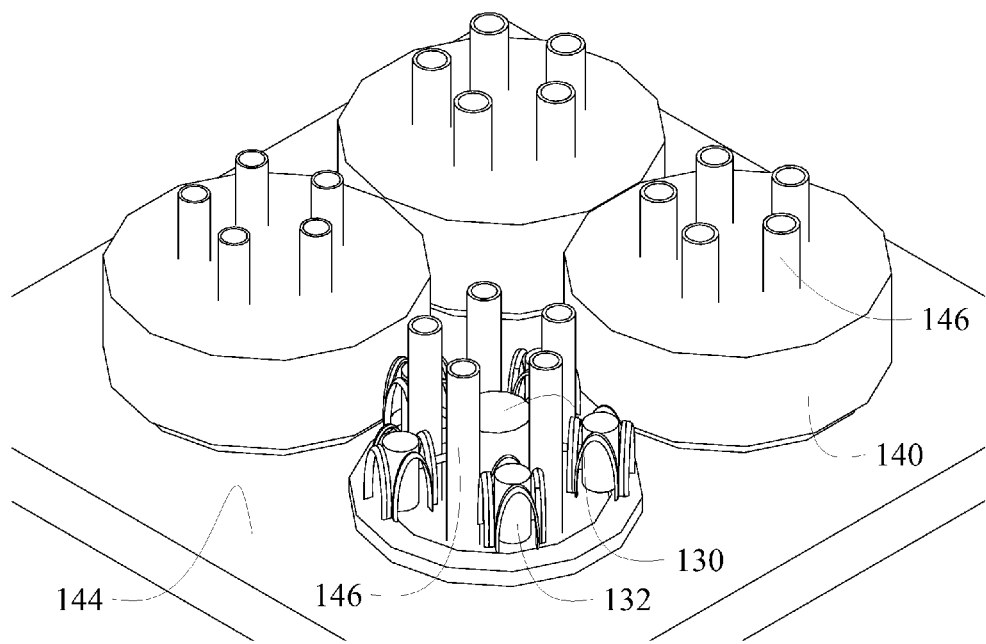
FIG. 22 is a perspective view of a bed with multiple unitary cells having transverse cooling tubes integral to each cell with the encapsulation removed from one cell for clarity.

As an alternative, the transverse tubes 146 may extend through the envelopes 140 of the unitary cells 128 as seen in FIG. 22. This embodiment provides direct contact of the transverse tubes with the second working fluid. The transverse tubes 146 may extend through the surface 144 and through any opposing surface abutting the unitary cell(s). While shown as extending from both surfaces, if the envelopes 140 constitute the inner surface (for example in a helmet embodiment), the transverse tubes may terminate flush with the surface of the envelope 140.

Figure 23:
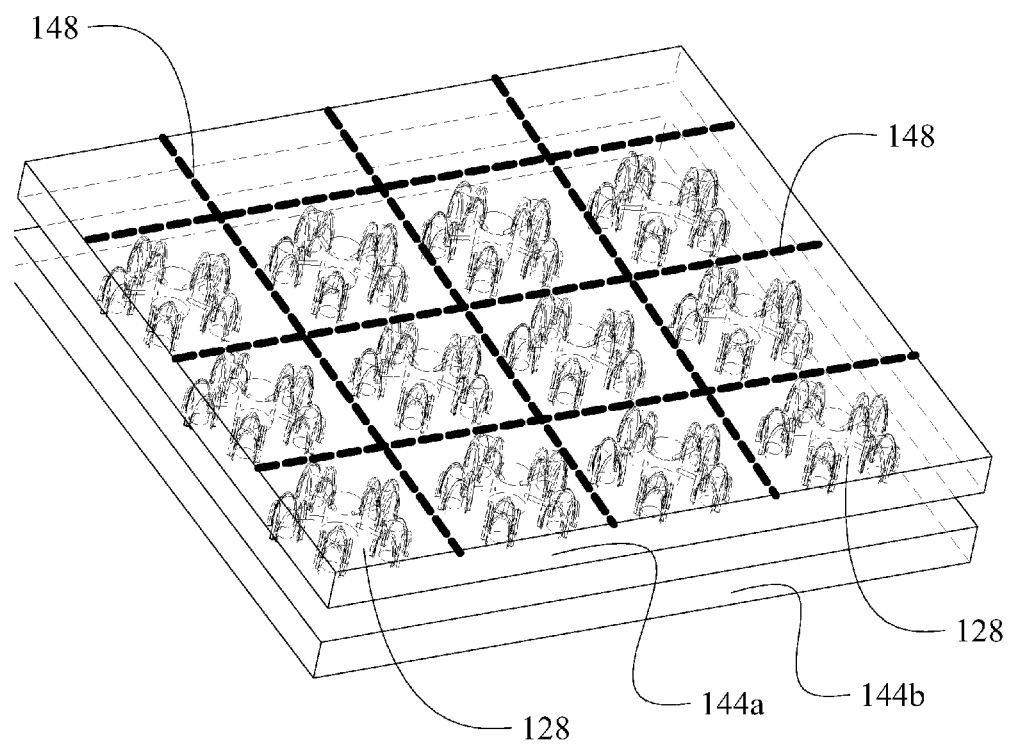
FIG. 23 is a perspective view of a bed and liner with multiple unitary cells which are individually removable by cutting on identifying indicia.

As shown in FIG. 23 for an additional embodiment, the unitary cells 128 may be encompassed between continuous inner and outer sheets or plates 144a, 144b. The plates may be marked with indicia such as cut lines 148 such that if a unitary cell suffers a failure such as a ruptured collapsible cylinder or reservoir, the plate may be separated along the indicia and the unitary cell or cells replaced. The cut lines may be perforated to allow removal of the associated section of the plate without the use of a cutting implement. The embodiment shown employs arcuate filaments as supplemental mechanical restoring elements but alternative embodiments may use pillars or other mechanical restoring elements or no secondary mechanical restoring capability.

While described herein with respect to wearable pads or helmets, the unitary cells disclosed may be employed on any surface requiring impact absorbing capability such as hockey arena walls, goal post pads, floor mats or floors for wrestling, gymnastics, tumbling or dancing, cell phone cases, shipping cases or other protective devices.

Figure 24:
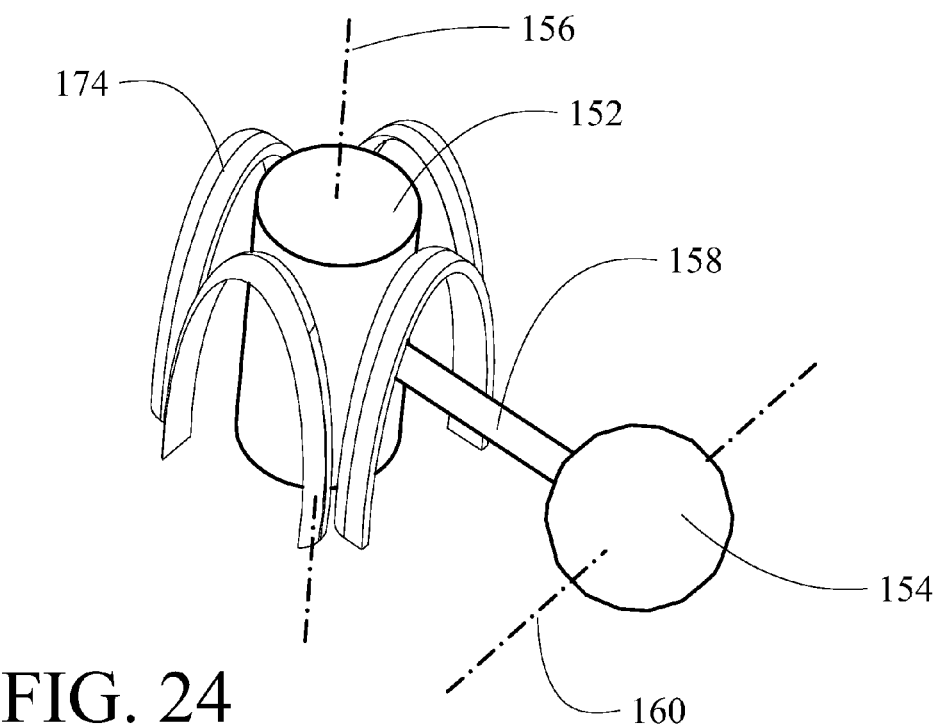
FIG. 24 is a perspective view of an embodiment for a shock absorber element having a compression cylinder connected to a dedicated accumulator.

Alternative arrangements of compression cylinders and accumulators may be employed in the unitary cells. FIG. 24 shows an embodiment for a shock absorber element 150 having a compression cylinder 152 connected to a dedicated accumulator 154. Accumulator 154 is substantially spherical in the drawing shown but may be elliptical or other ellipsoidal shape. The compression cylinder 152 has an axis of compression 156. As in prior embodiments, the compression cylinder 152 encapsulates a working fluid. When the cylinder is compressed, the working fluid is forced from the compression cylinder 152 through a connecting conduit 158 into the accumulator 154. As will be described in greater detail subsequently, accumulator 154 resiliently expands when receiving the working fluid. A primary axis of expansion 160 which is substantially perpendicular to the axis of compression is present.

Figure 25:
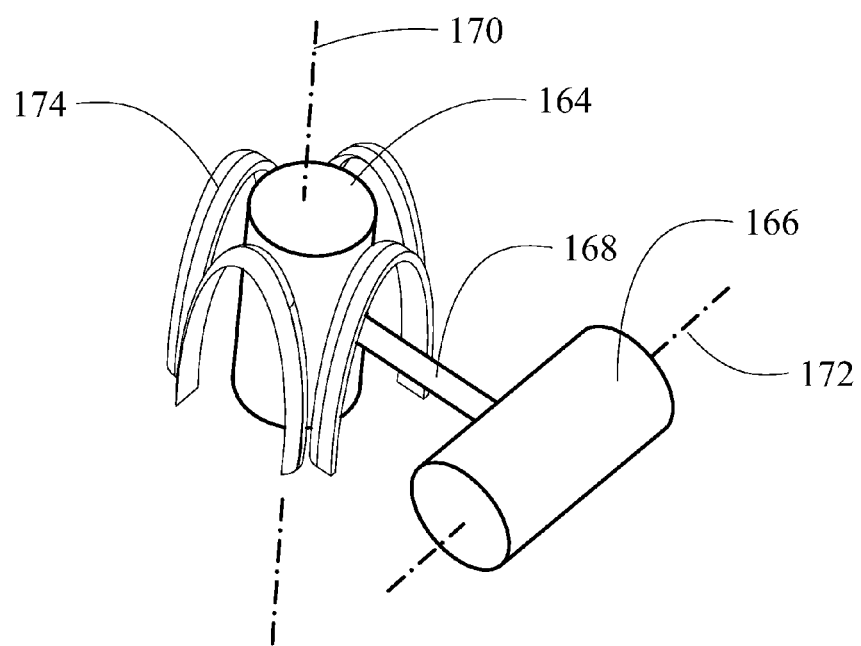
FIG. 25 is a perspective view of an alternative embodiment for a shock absorber element having a compression cylinder connected to a dedicated accumulator.

FIG. 25 shows an alternative embodiment for a shock absorber element 162 having a compression cylinder 164 connected to a dedicated accumulator 166 which is substantially cylindrical in shape. As in the prior embodiment, compression cylinder 164 is connected to accumulator 166 with a conduit 168 for transfer of the working fluid during compression. Also as in the prior embodiment, compression cylinder 164 has an axis of compression 170 and resilient accumulator has a primary axis of expansion 172.

Upon receiving an impact, force created by the impact causes compression cylinders 152 or 164 to resiliently collapse along the axis of compression 156, 170. Working fluid forced from the compression cylinder 152, 164 is pressurized through conduit 158, 168 into the accumulator 154, 166 which resiliently expands. Upon release of the impact force, the resilient accumulators 154, 166 will return the pressurized working fluid back through conduits 158, 168 to reexpand the compressible cylinders 152, 164. Both of the embodiments of FIGS. 24 and 25 may additionally employ mechanical restoring elements to assist the hydrodynamic force from the pressurized reservoir in erecting the cylinder from a collapsed state as described for prior embodiments. As shown in FIGS. 24 and 25, arcuate filaments 174 may be employed to surround the compressible cylinders 152, 164 as shown for the cylinders in the figures. As previously described for an earlier embodiment, the arcuate filaments may be substantially perpendicular to each other and surround the compressible cylinder. Alternatively, rod like upstanding filaments or pillars as described in previous embodiments may also be employed to surround the cylinders. The arcuate filaments 174 or pillars are resiliently flexible and oriented substantially perpendicular to the impact surface, parallel to the axis of compression, and also provide a cushioning or shock absorbing capability to supplement the compressible cylinders in attenuating the impulse. Upon deformation, the arcuate filaments 174 or pillars resiliently return to their original shape to assist in expansion of compressible cylinders 152, 164 with pressurized working fluid from the accumulator 154, 166.

Figure 26A:
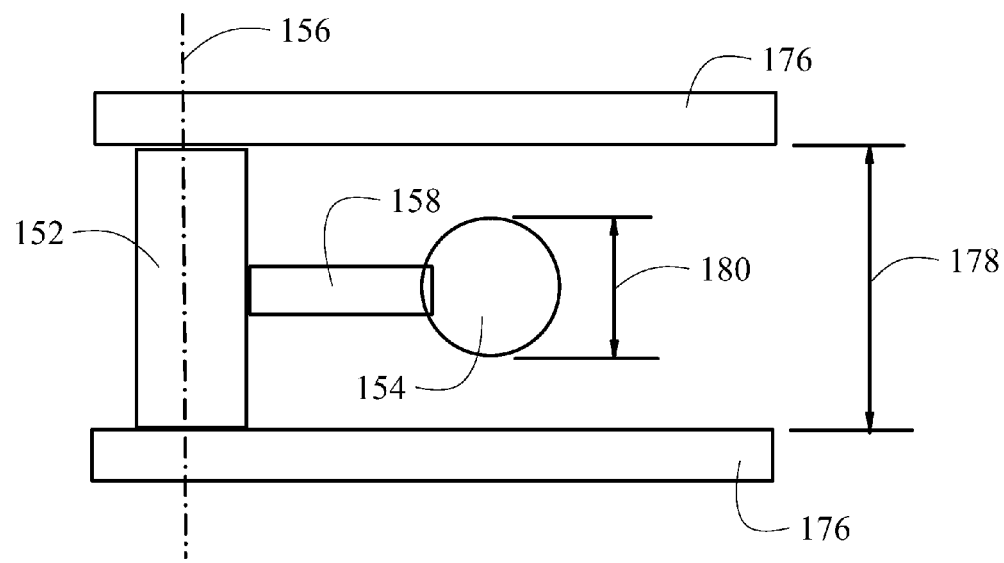
FIG. 26A is a side view of the embodiment of FIG. 24 in an uncompressed condition.
Figure 26B:
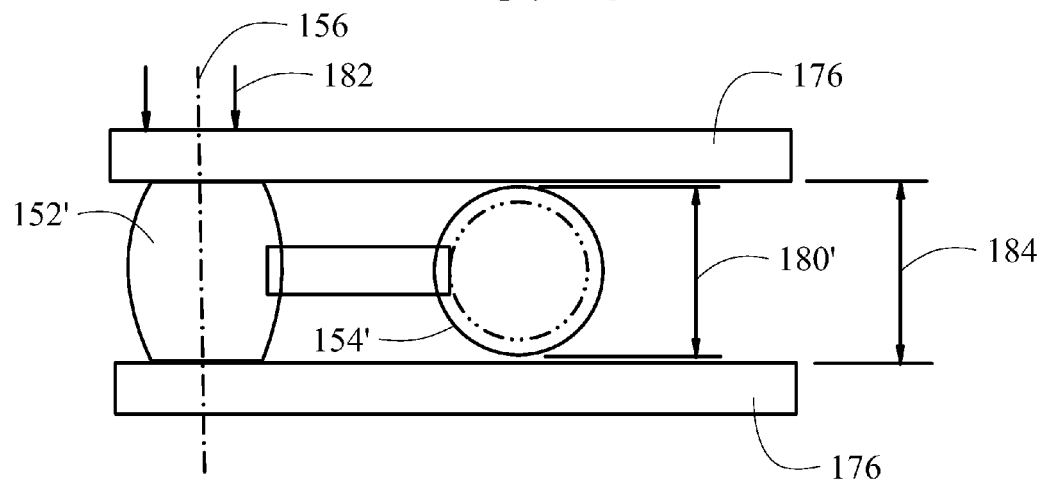
FIG. 26B is a side view of the embodiment of FIG. 24 in a compressed condition.

Details of the shock absorption mechanics of the embodiments of FIGS. 24 and 25 are seen in FIGS. 26A, 26B and 27A, 27B. FIG. 26A is a side view of the embodiment of FIG. 24 in an uncompressed condition with end plates 176 shown for embodiments incorporated in unitary cells as will be described subsequently. Prior to an impact, compressible cylinder 152 has an expanded dimension 178 and accumulator 154 has an unexpanded diameter 180 parallel to the compression axis 156. As seen in FIG. 26B for a compressed condition due to an impact force represented by arrows 182, the compressible cylinder, shown in the compressed state as 152', has been compressed to a dimension 184. However, since the accumulator 154 is spherical, the resilient expansion occurs, at least in part, perpendicular to the axis of compression represented nominally by the primary axis of expansion. The increase to diameter 180' of the accumulator remains less than the compressed dimension 184 of the compressible cylinder 152' allowing the impact force to be absorbed by the compressible cylinder. If the impact has sufficient energy such that the force of compression is great enough to force end plates 176 into contact with the expanded accumulator 154', any further compression of the end plates will also be reacted by compression of the accumulator 154' parallel to the axis of compression which will resiliently expand substantially perpendicular to the axis of compression. This configuration provides a step function for absorption of impacts with high energy.

Figure 27A:
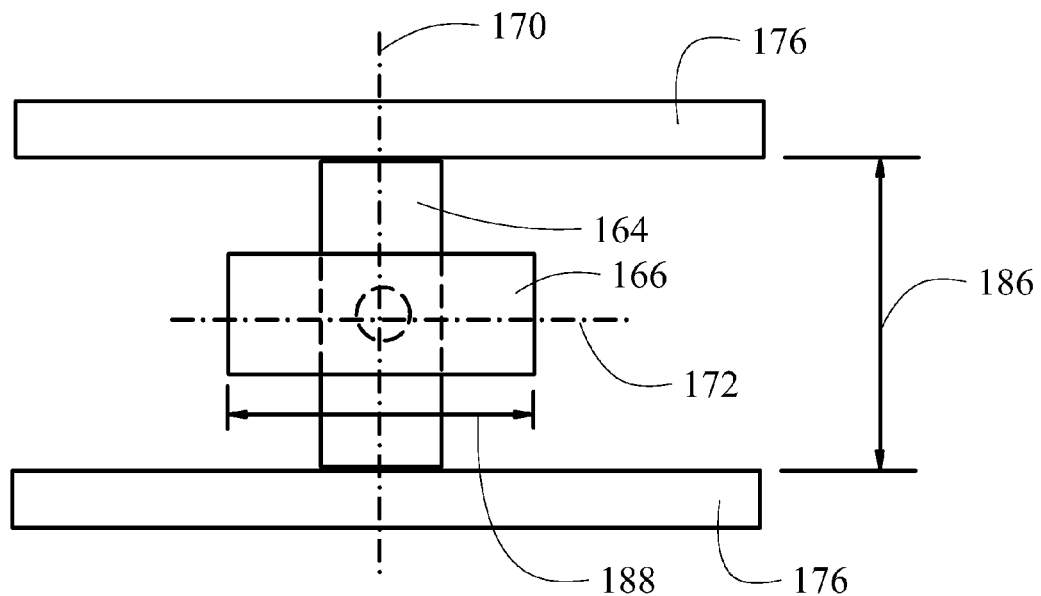
FIG. 27A is a side view of the embodiment of FIG. 25 in an uncompressed condition.
Figure 27B:
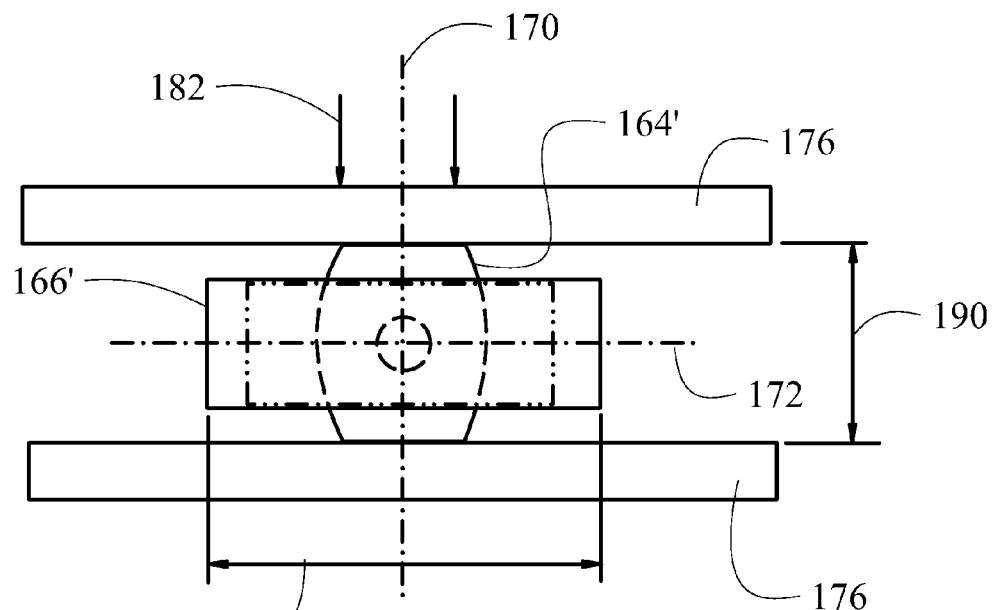
FIG. 27B is a side view of the embodiment of FIG. 25 in a compressed condition.

Similarly, FIG. 27A shows a side view of the embodiment of FIG. 25 in an uncompressed condition. Prior to an impact, compressible cylinder 164 has an erect dimension 186 and accumulator 166 has an unexpanded dimension 188 parallel to the primary axis of expansion 172. As seen in FIG. 26B for a compressed condition due to an impact force represented by arrows 182, the compressible cylinder, shown in the compressed state as 164', has been compressed to a dimension 190. However, since the accumulator 166 is cylindrical with a major axis parallel to the primary axis of expansion, the resilient expansion occurs, primarily along the primary axis of expansion to dimension 188' and any increase to diameter of the accumulator remains less than the compressed dimension 190 of the compressible cylinder 164' allowing the impact force to be absorbed by the compressible cylinder. If the impact has sufficient energy such that the force of compression is great enough to force end plates 176 into contact with the expanded accumulator 164', any further compression of the end plates will also be reacted by compression of the accumulator 164' parallel to the axis of compression which will resiliently expand substantially perpendicular to the axis of compression. As with the prior embodiment his configuration provides a step function for absorption of impacts with high energy.

While shown for the two exemplary embodiments as a sphere or a cylinder perpendicular to the axis of compression, the accumulator may employ any desired shape having the properties for expansion primarily perpendicular to the axis of compression to allow primary shock absorption by the compressible cylinder with a step function increase in reaction if the compression is sufficient to cause engagement of the accumulator.

Figure 28:
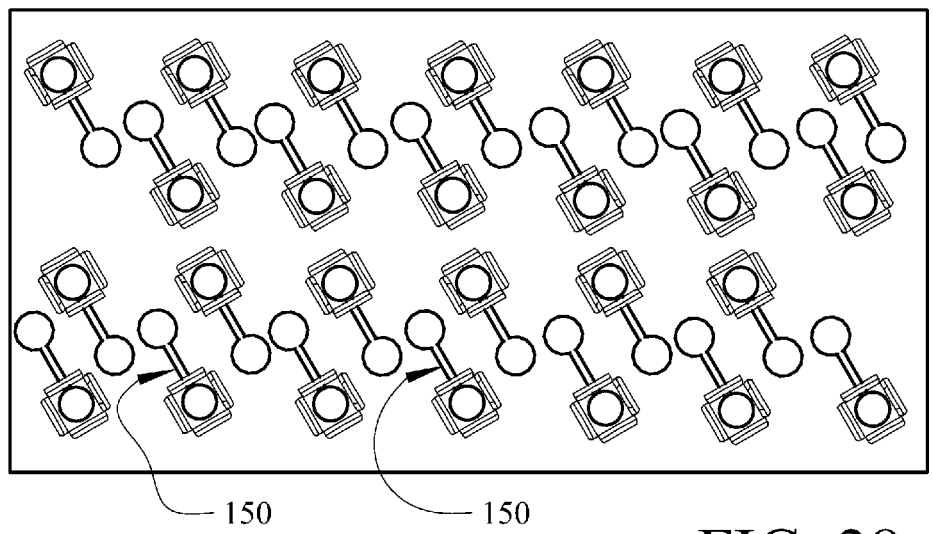
FIG. 28 is a top view of an array of shock absorber elements arranged in a unitary cell or pad.
Figure 29:
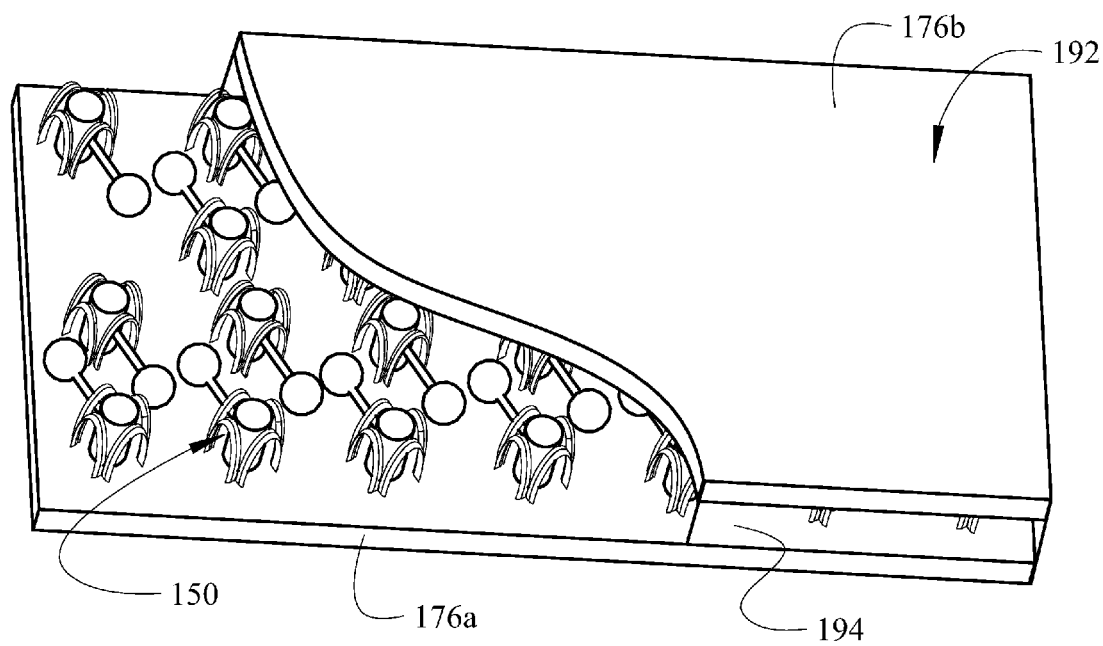
FIG. 29 is a perspective view of the array of shock absorber elements of FIG. 28 showing the bottom plate, and the top plate in partial section with sealing walls.

FIG. 28 is a top view of an array of shock absorber elements 150 arranged in a unitary cell. While an array of 26 shock absorber elements 150 is shown as exemplary, larger or smaller arrays may be employed. As seen in FIG. 29 the array of shock absorber elements 150 may be constrained between a bottom plate 176a, and the top plate 176b forming an envelope for the unitary cell 192. Sealing walls 194 allow the unitary cell to be sealed to contain a secondary working fluid as described for prior embodiments. As in prior embodiments, the first working fluid may be colored and the envelope semi or fully transparent to allow easy recognition of a ruptured component.

Figure 30:
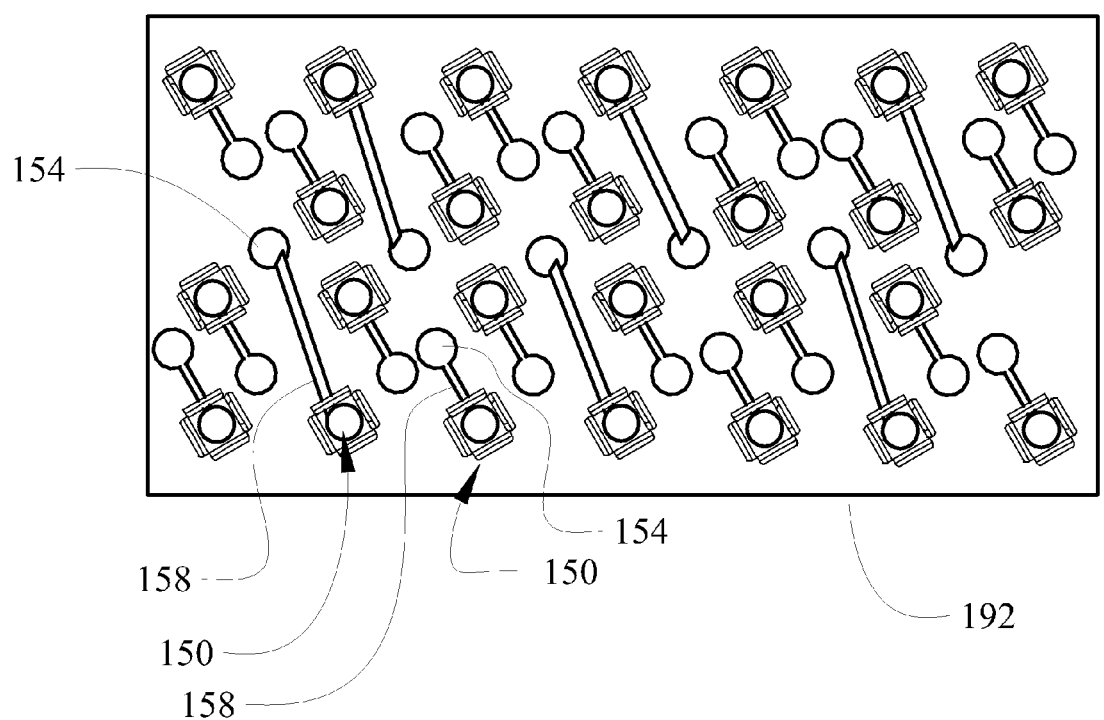
FIG. 30 is a top view of an array of shock absorber elements with the accumulators placed at spaced locations; and, FIG. 31 is a top view of an array of shock absorber cylinders in mated pairs.

The embodiment described with respect to FIGS. 28 and 29 provides equal geometry for each shock absorber element 150. However, the length of conduits joining the accumulators and compressible cylinders may be different and the sizing of the cylinders and accumulators may be different for various shock absorber elements in the array. FIG. 30 is a top view of an array of shock absorber elements 150 in a unitary cell 192 with the accumulators placed at locations having differing length of the conduits 158 to allow convenient placement of the accumulators 154 in voids within the unitary cell.

Figure 31:
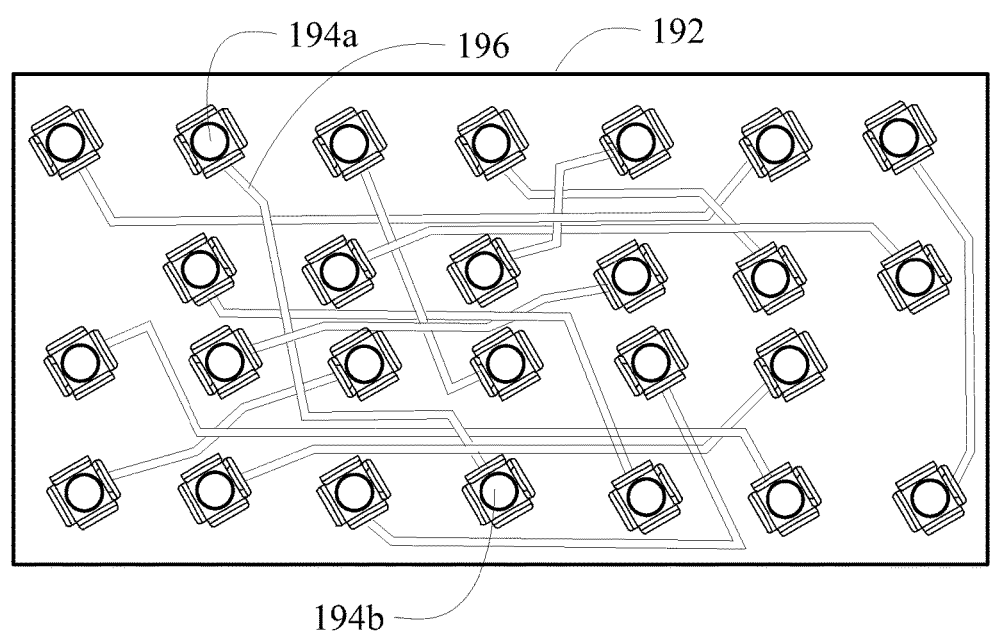

As an alternative embodiment, the unitary cell 192 may employ compressible cylinders mated as pairs as shown in FIG. 31. Each compressible cylinder in a pair is located distal from its mated cylinder at separated positions in the cell such that an impact causing compression of one cylinder in the pair would not be likely to create a compression of the second cylinder in the pair. When a first cylinder in the pair is compressed due to an impact the second cylinder in the pair acts as an accumulator receiving the working fluid from the first cylinder. Upon relieving the force of the impact, the second cylinder returns working fluid to the first cylinder to return to an expanded condition. As shown compressible cylinder 194a is mated through conduit 196 to compressible cylinder 194b. The location and distance of the paired cylinders may be arbitrary and conduits 196 may be routed between the paired cylinders. As in the prior embodiments, arcuate filaments 174 may be employed to surround the compressible cylinders 194a, 194b, as shown for the cylinders in the figures. As previously described for an earlier embodiment, the arcuate filaments may be substantially perpendicular to each other and surround the compressible cylinder. Alternatively, rod like upstanding filaments or pillars as described in previous embodiments may be employed to surround the cylinders. The arcuate filaments 174 or pillars are resiliently flexible and oriented substantially perpendicular to the impact surface, parallel to the axis of compression, and also provide a cushioning or shock absorbing capability to supplement the compressible cylinders in attenuating the shock. Upon deformation, the arcuate filaments 174 or pillars resiliently return to their original shape thereby urging an envelope, upper plate or liner (as previously described) upward to assist in expansion of compressed cylinder, as an example 194a, with pressurized working fluid from the mated cylinder 194b. The arcuate filaments or pillars may be randomly distributed throughout the cell for impulse attenuation and are not limited to surrounding the chambers.

As with prior embodiments, unitary cells 192 of the described embodiments of FIGS. 28, 29, 30 and 31 may be removably attached to wearable pads or helmets, or any surface requiring impact absorbing capability such as hockey arena walls, goal post pads, floor mats or floors for wrestling, gymnastics, tumbling or dancing, cell phone or computer cases or similar protective devices. Similarly, the shock absorber elements 150 of the unitary cells of FIGS. 28, and 29 may be may be encompassed between continuous inner and outer sheets or plates creating pads. The plates or pads may be marked with indicia such as cut lines previously described with respect to alternative embodiments such that if a shock absorber element or multiple elements suffer a failure such as a ruptured compressible cylinder or accumulator, the plate or pad may be separated along the indicia and the unitary cell or cells replaced. The cut lines may be perforated to allow removal of the associated section of the plate or pad without the use of a cutting implement. The embodiments of the unitary cells 192 shown employ arcuate filaments as supplemental mechanical restoring elements but alternative embodiments may use pillars or other mechanical restoring elements or no secondary mechanical restoring capability.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A shock absorbing system for impact energy dissipation comprising:
    a surface,
    a least one unitary cell having a plurality of compressible cylinders extending substantially perpendicular to the surface each compressible cylinder containing a first working fluid, and
    a reservoir connected to each of the plurality of compressible cylinders through an associated one of a plurality of fluid conduits, said first working fluid transferred by at least one compressible member through the associated one of the plurality of fluid conduits to the reservoir responsive to compression of the at least one compressible member induced by an impact force; wherein each unitary cell is removably affixed to the surface of a foot bed, a helmet shell, a pad, a wall or a liner; wherein plurality of compressible cylinders and reservoir are enclosed within an envelope; wherein the envelope forms a cavity surrounding the compressible cylinders and the reservoir.

2. The shock absorbing system as defined in claim 1 further comprising a flow restriction element associated with each fluid conduit.

3. The shock absorbing system as defined in claim 1 further comprising a plurality of resilient structural members intermediate said plurality of compressible members, said resilient structural cylinders resiliently deforming responsive to compression of the unitary cell induced by an impact.

4. The shock absorbing system as defined in claim 3 wherein the resilient structural members comprise upstanding arcuate filaments.

5. The shock absorbing system as defined in claim 4 wherein the upstanding arcuate members surround each compressible member.

6. The shock absorbing system as defined in claim 3 wherein the resilient structural members comprise upstanding pillars extending from the surface.

7. The shock absorbing system as defined in claim 1 further comprising a second working fluid contained in said cavity and transmissible intermediate said the compressible members.

8. The shock absorbing system as defined in claim 1 wherein the first working fluid is colored and the envelope is at least semitransparent.

9. The shock absorbing system as defined in claim 1 wherein the envelope of the unitary cell is removably affixed to the surface.

10. The shock absorbing system as defined in claim 9 further comprising a hook and loop fastener intermediate the envelope and surface.

11. The shock absorbing system as defined in claim 1 wherein the plurality of compressible cylinders comprises five compressible cylinders arranged pentagonally about the reservoir.

\* \* \* \* \*